Dec. 15, 1936.　　　G. H. MINER　　　2,064,025
GAME APPARATUS
Filed Jan. 12, 1932　　19 Sheets—Sheet 1
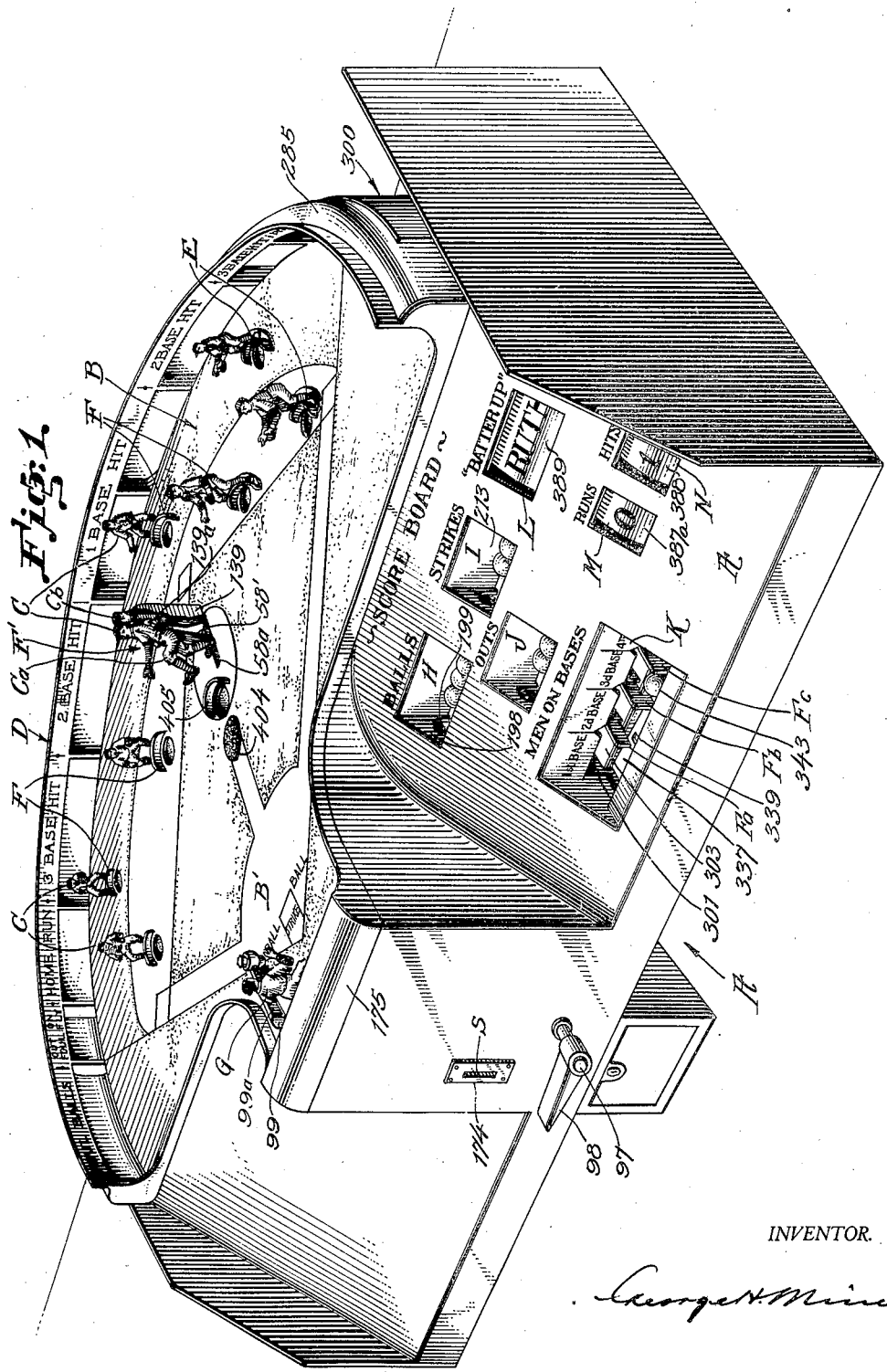
INVENTOR.

Dec. 15, 1936.  G. H. MINER  2,064,025
GAME APPARATUS
Filed Jan. 12, 1932   19 Sheets-Sheet 2
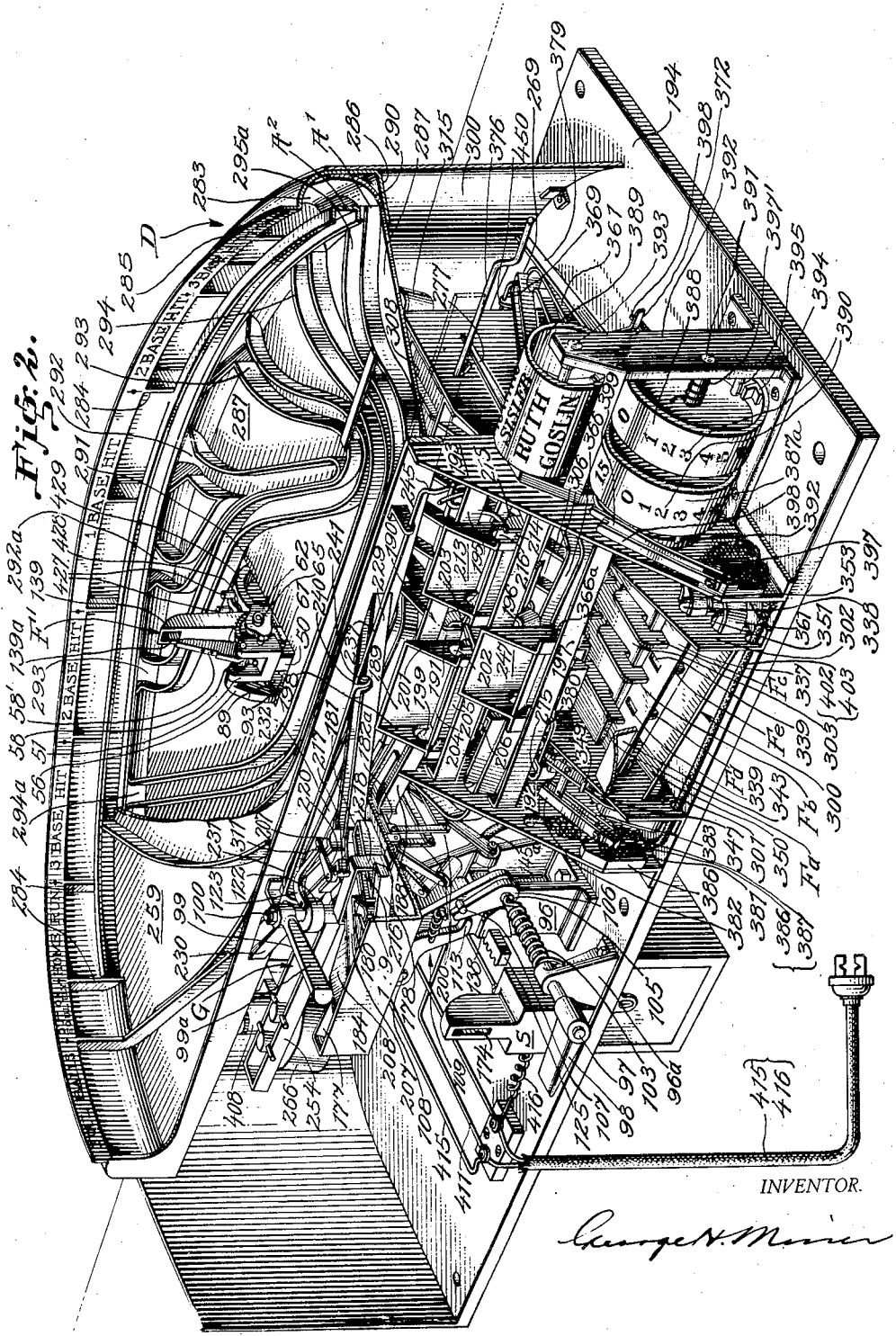
INVENTOR.

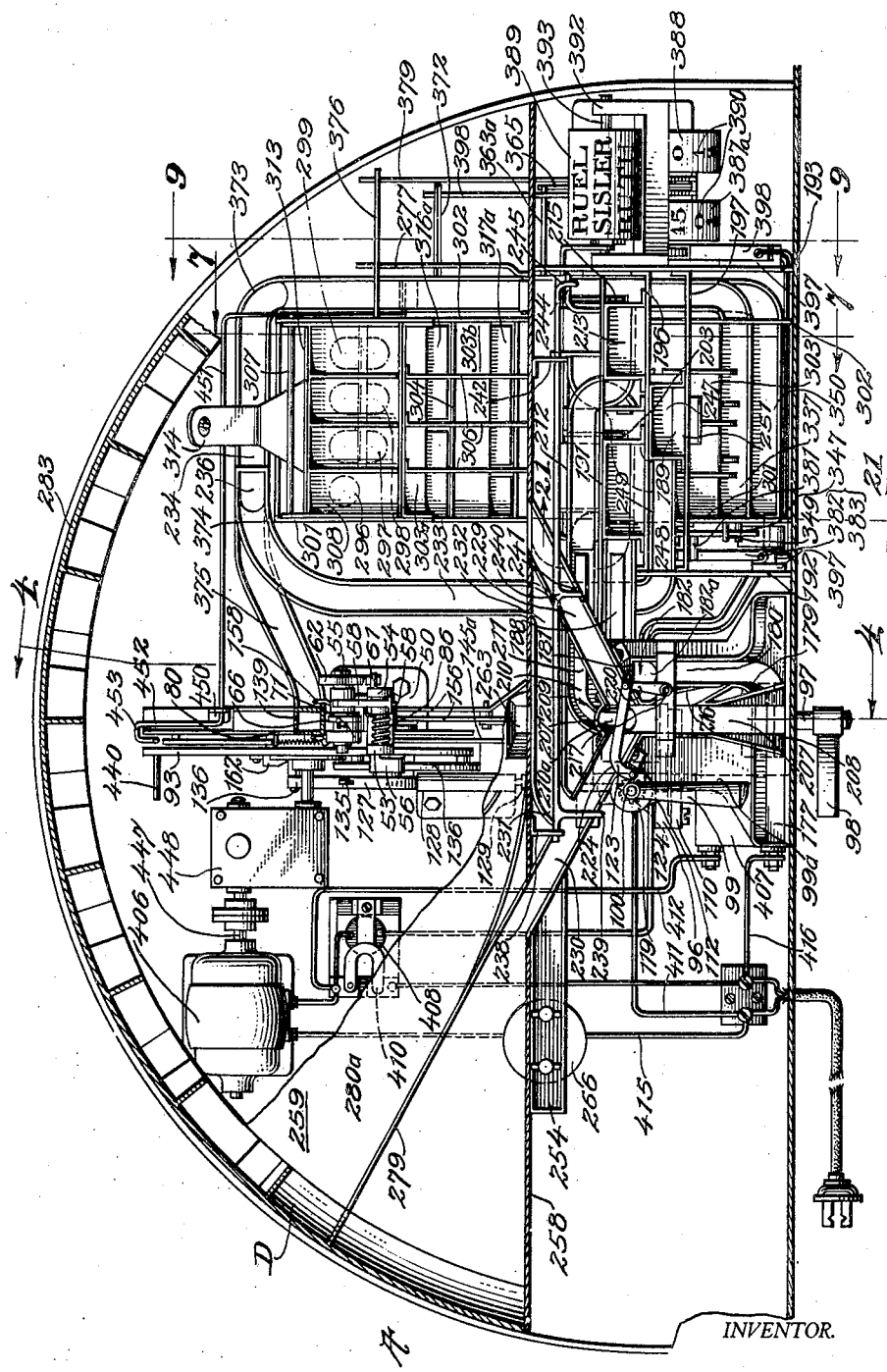

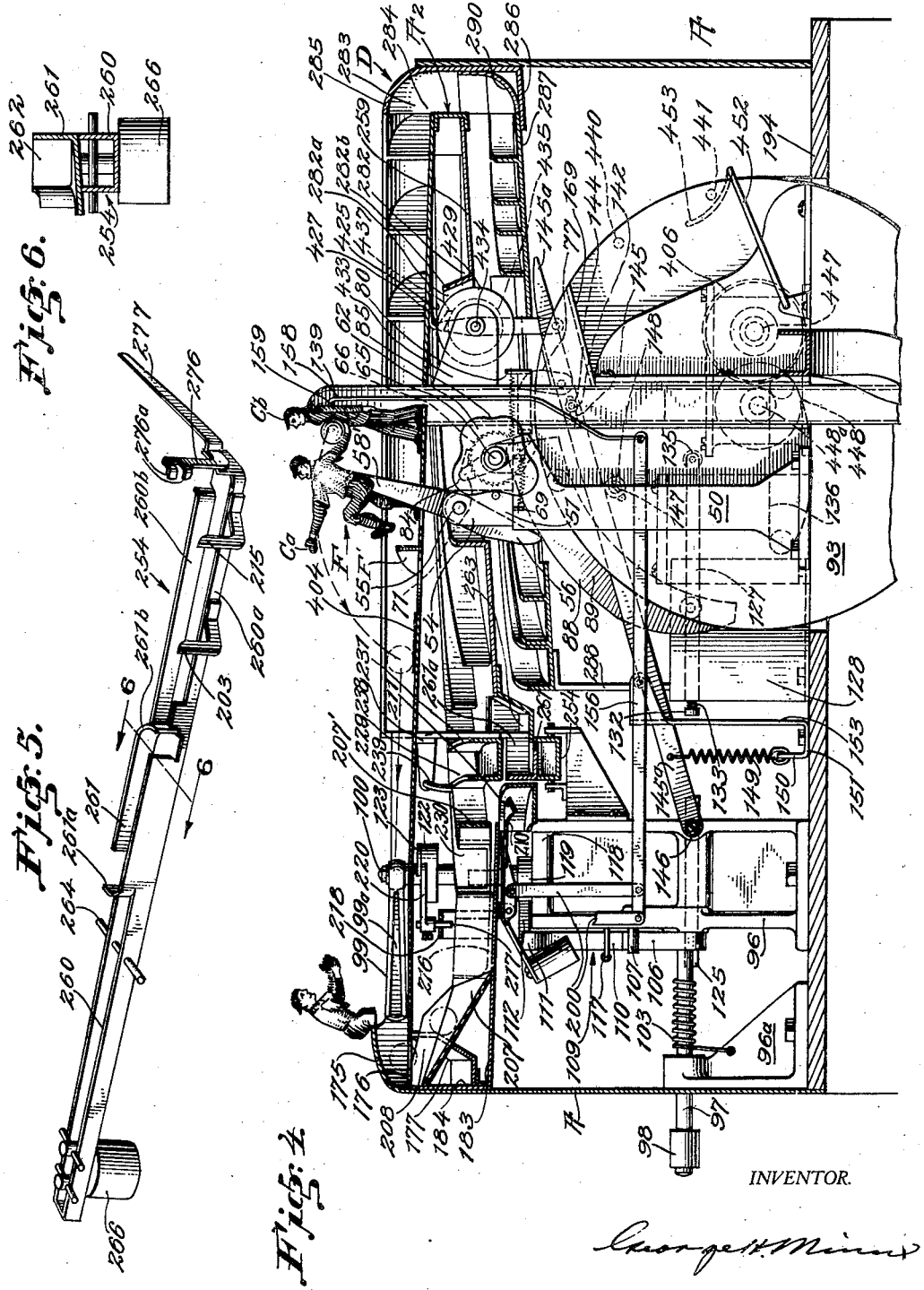

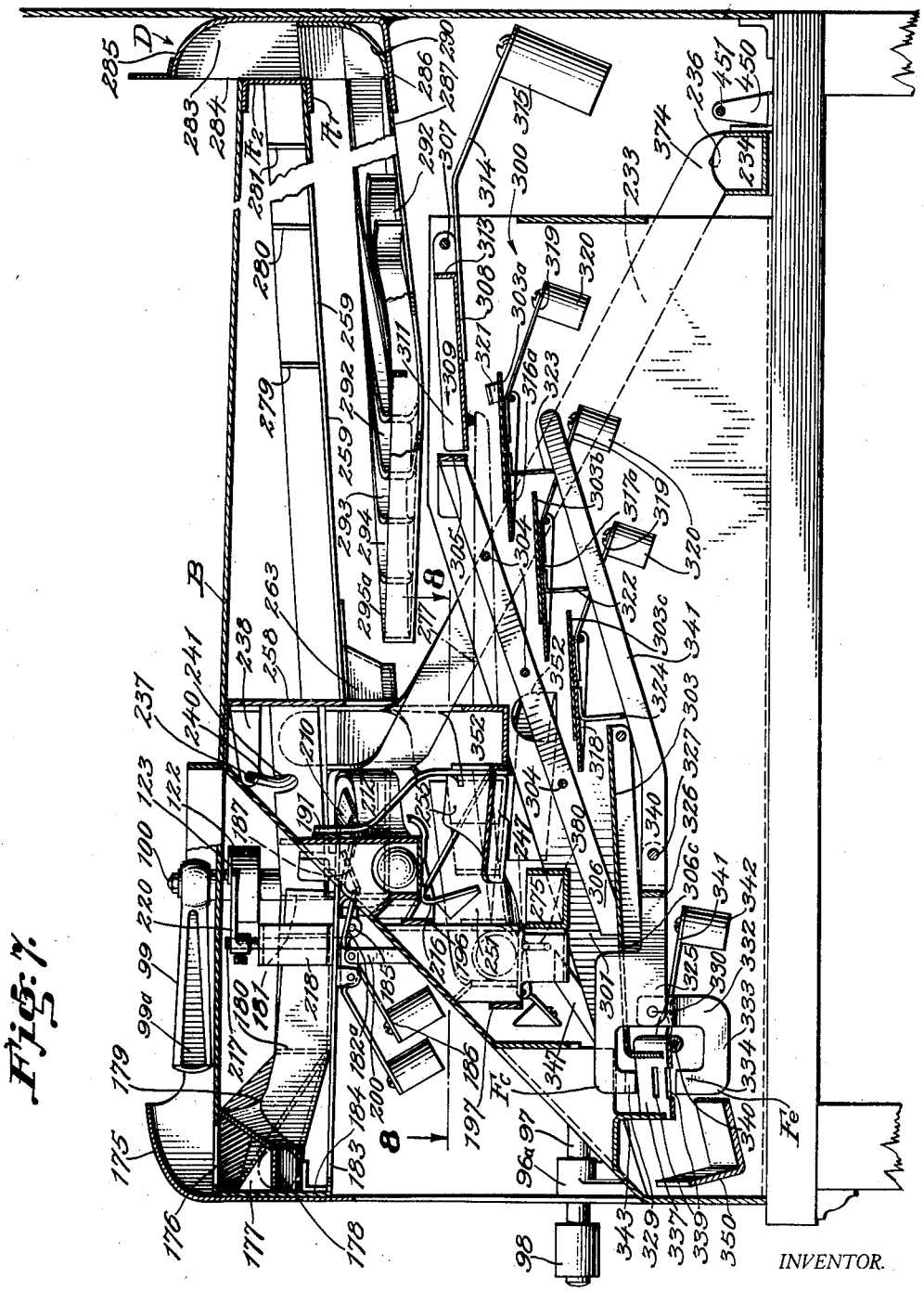

Dec. 15, 1936. G. H. MINER 2,064,025
GAME APPARATUS
Filed Jan. 12, 1932 19 Sheets-Sheet 6
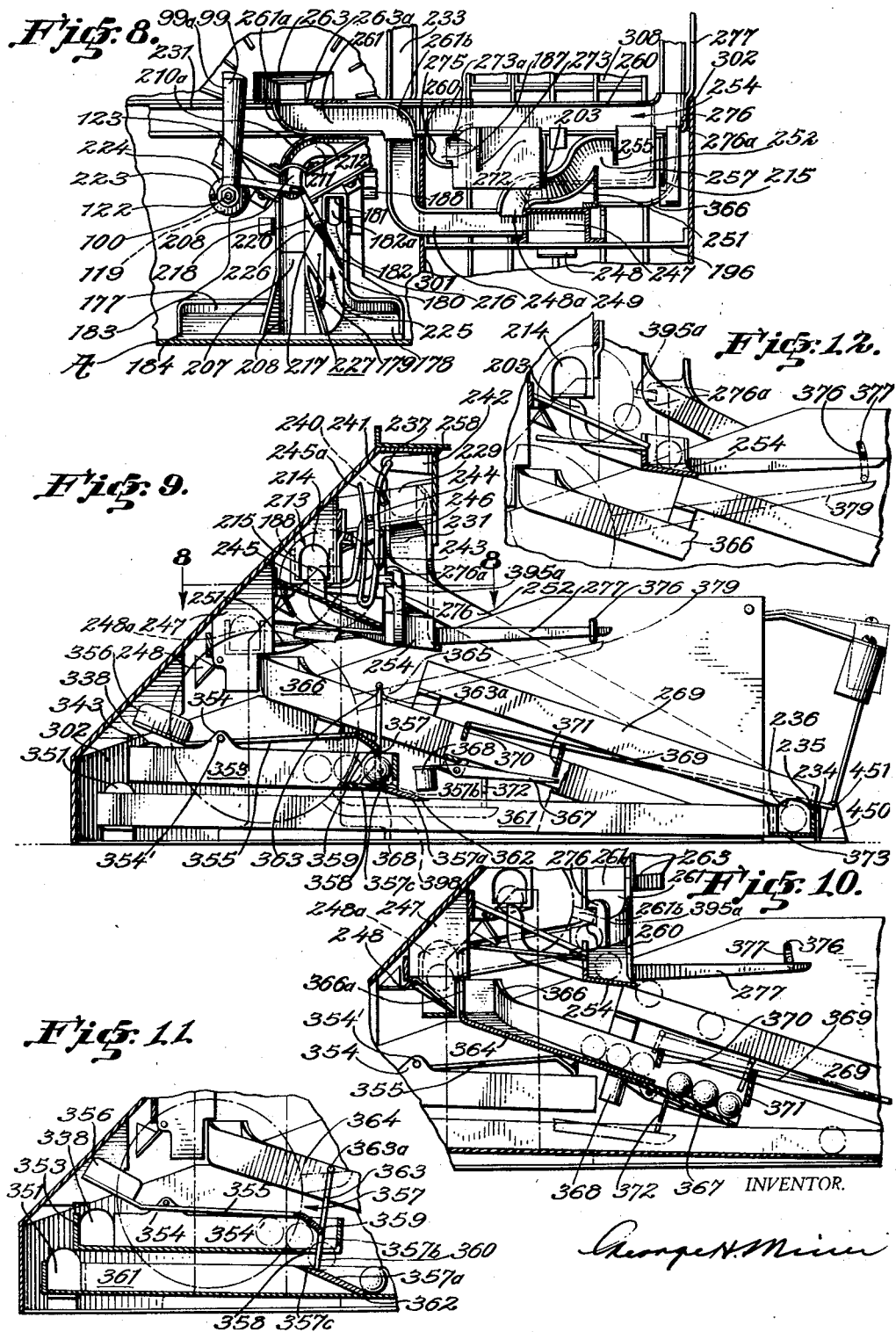

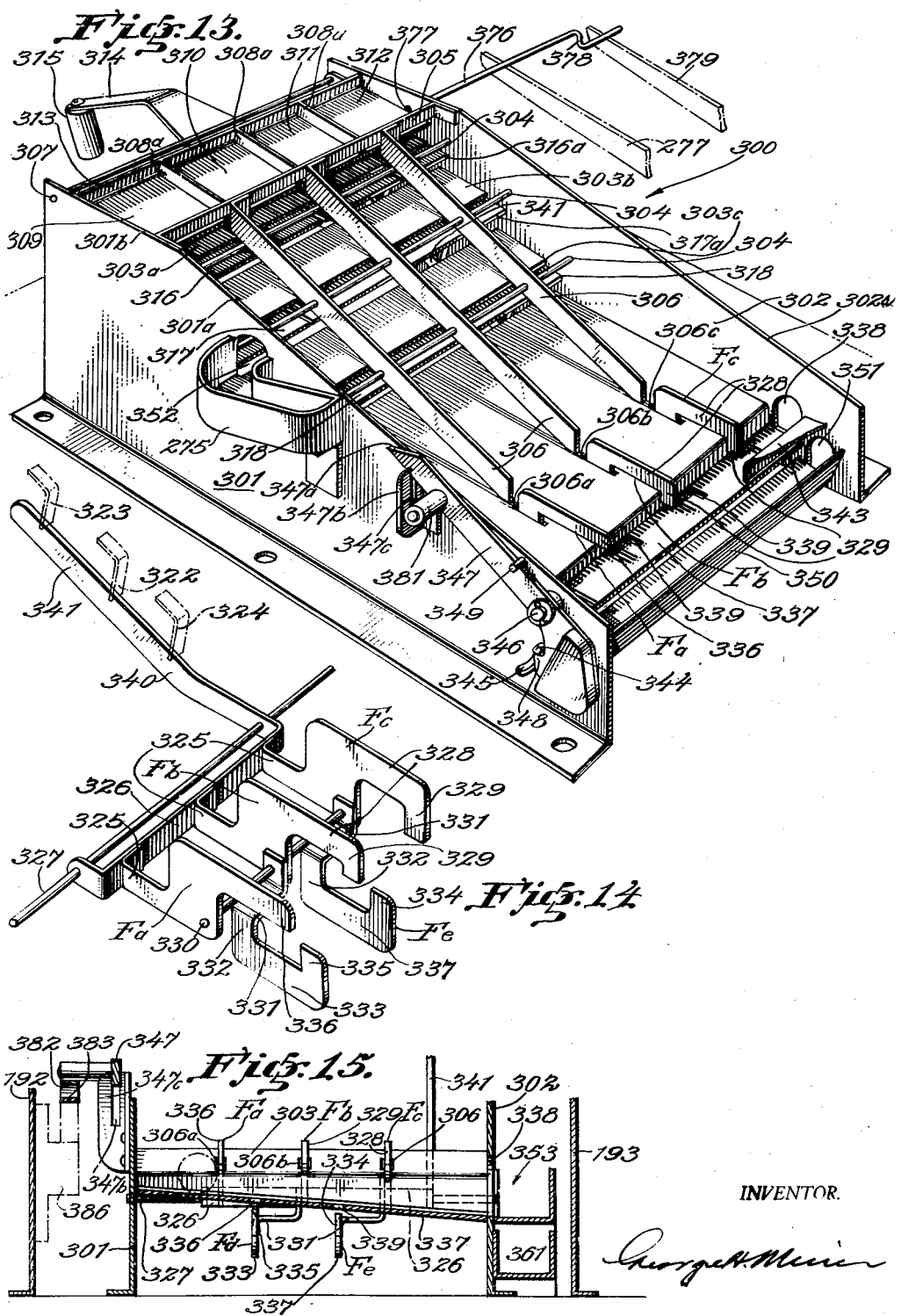

Dec. 15, 1936.　　　　G. H. MINER　　　　2,064,025
GAME APPARATUS
Filed Jan. 12, 1932　　　19 Sheets-Sheet 8
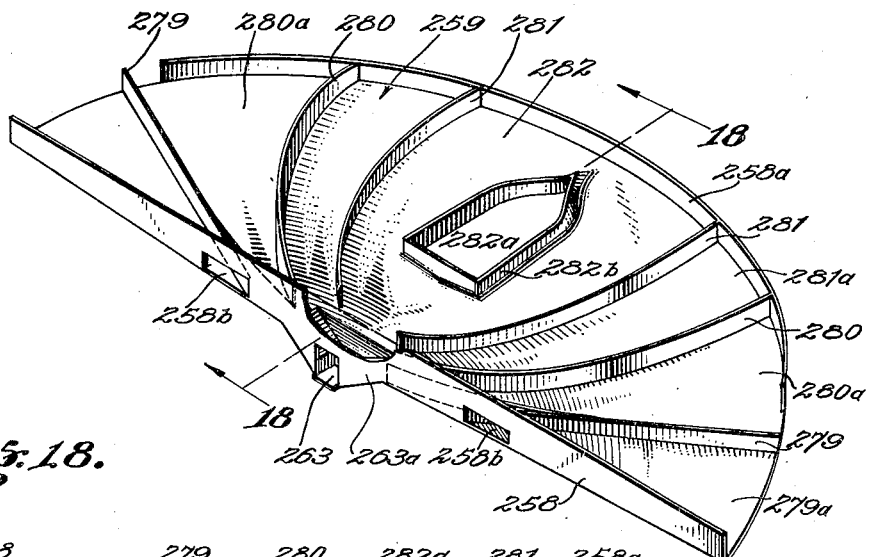
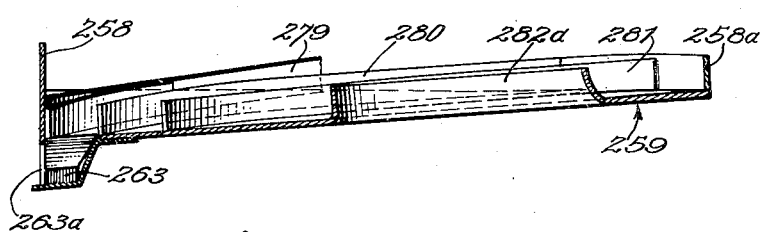
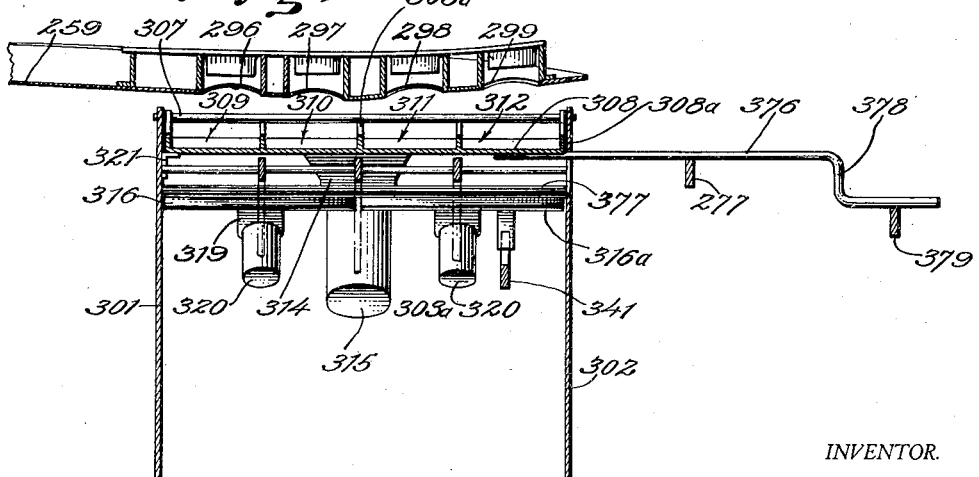
INVENTOR.
George H. Miner

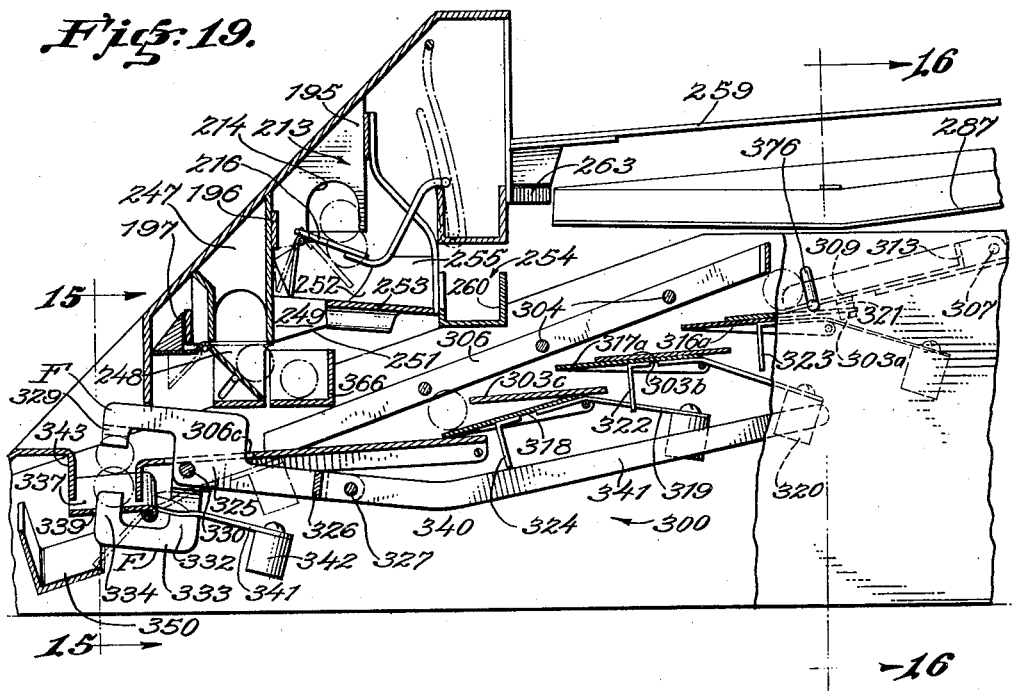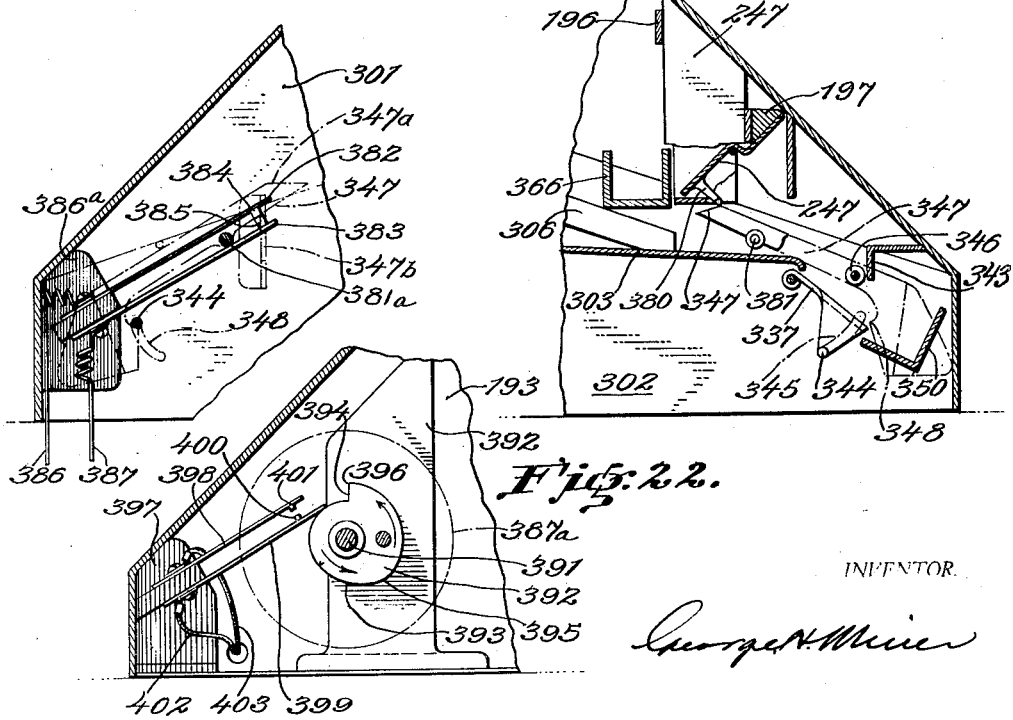

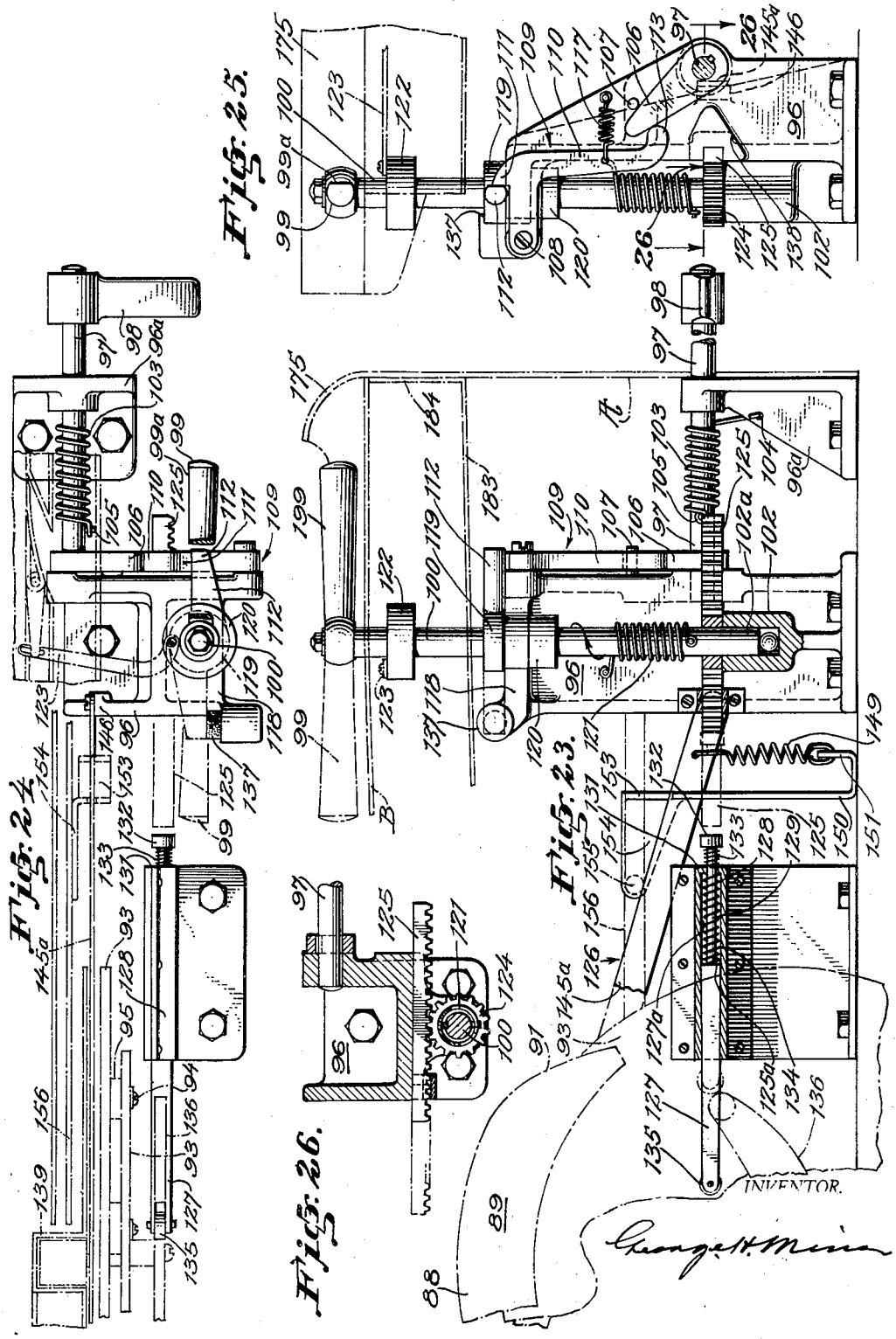

Dec. 15, 1936.    G. H. MINER    2,064,025
GAME APPARATUS
Filed Jan. 12, 1932    19 Sheets-Sheet 11
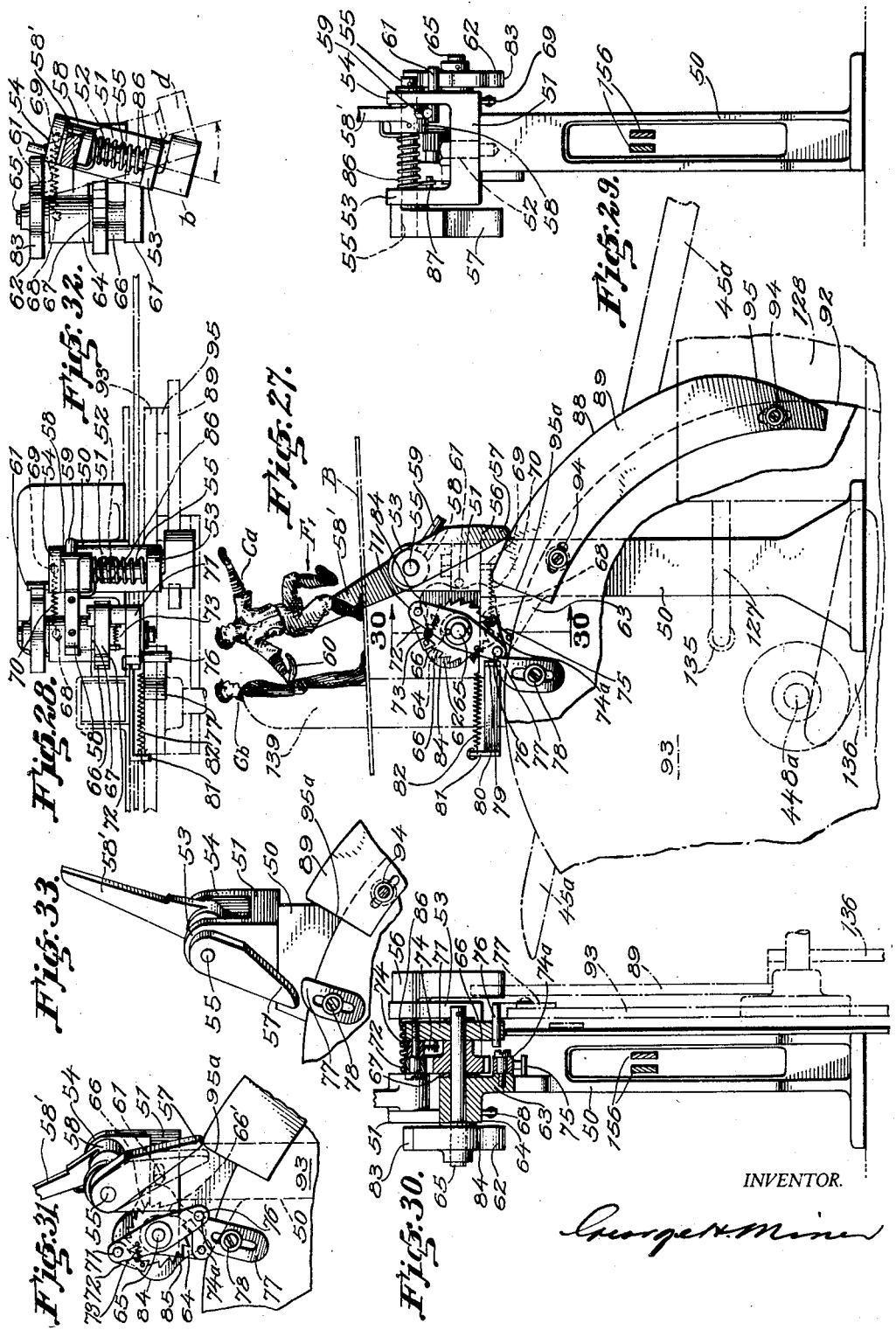
INVENTOR.
George H. Miner

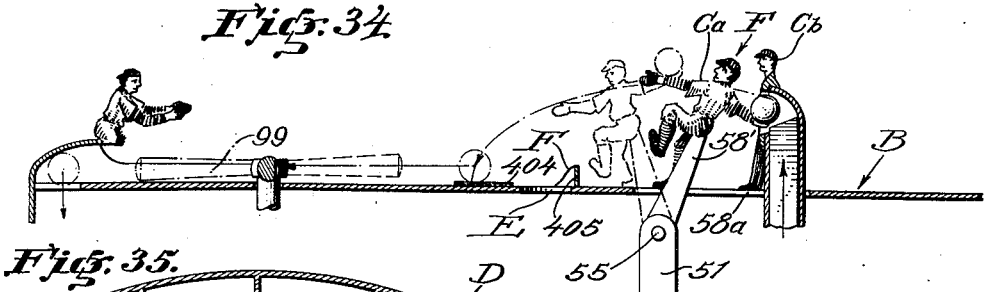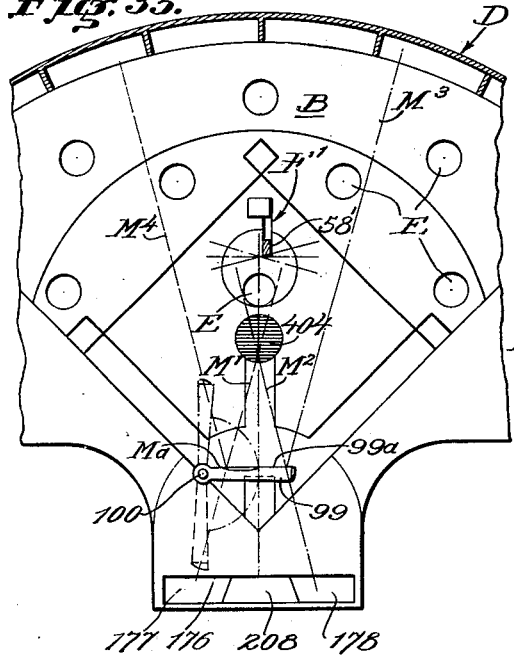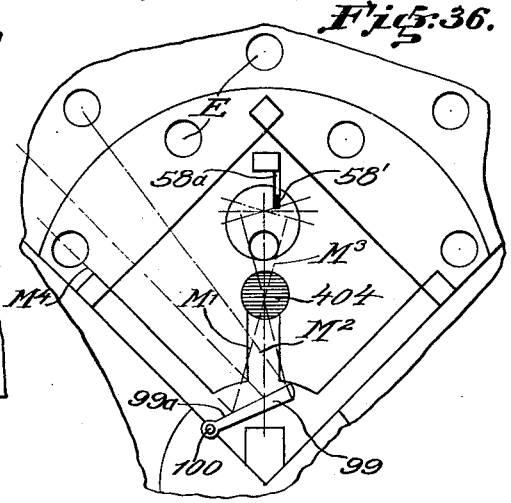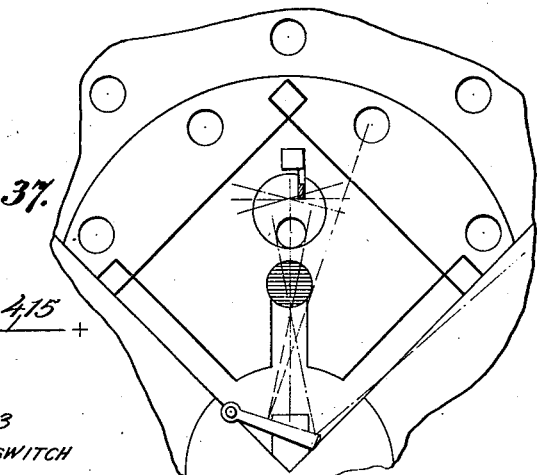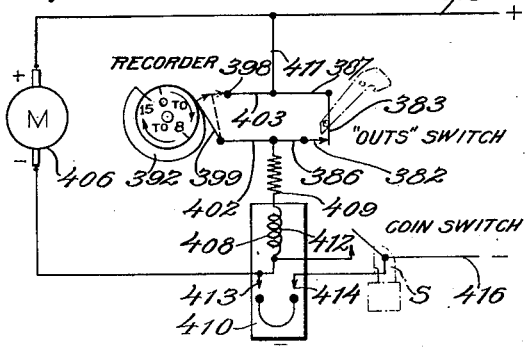

Dec. 15, 1936.  G. H. MINER  2,064,025
GAME APPARATUS
Filed Jan. 12, 1932   19 Sheets-Sheet 13
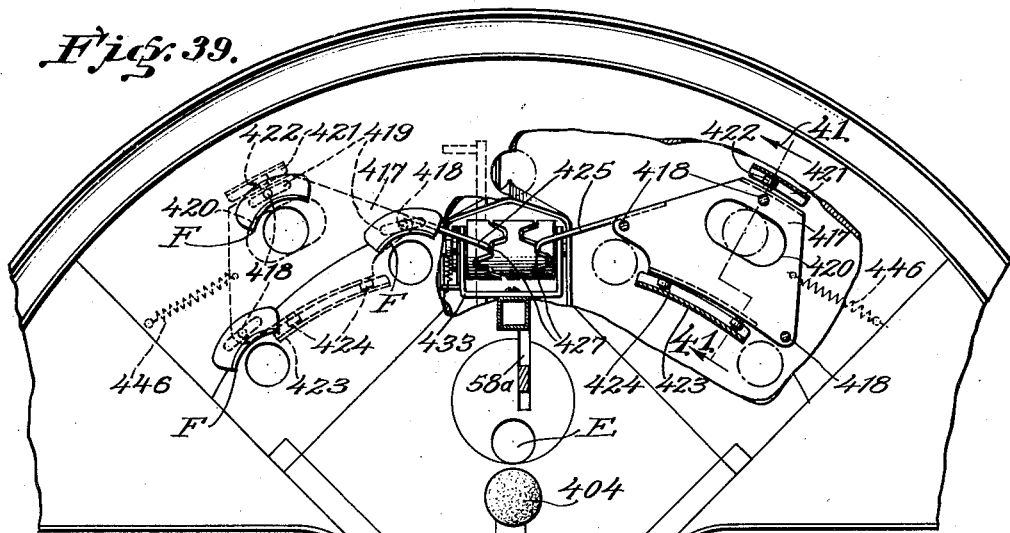
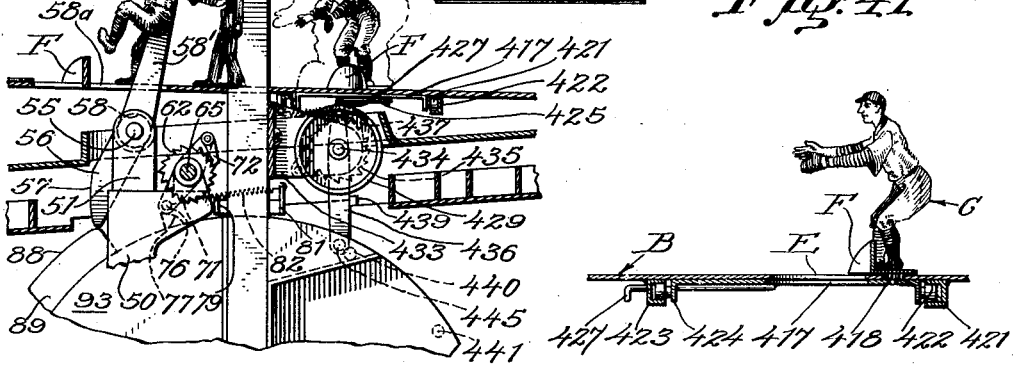
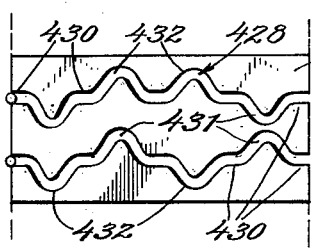
INVENTOR.
George H. Miner

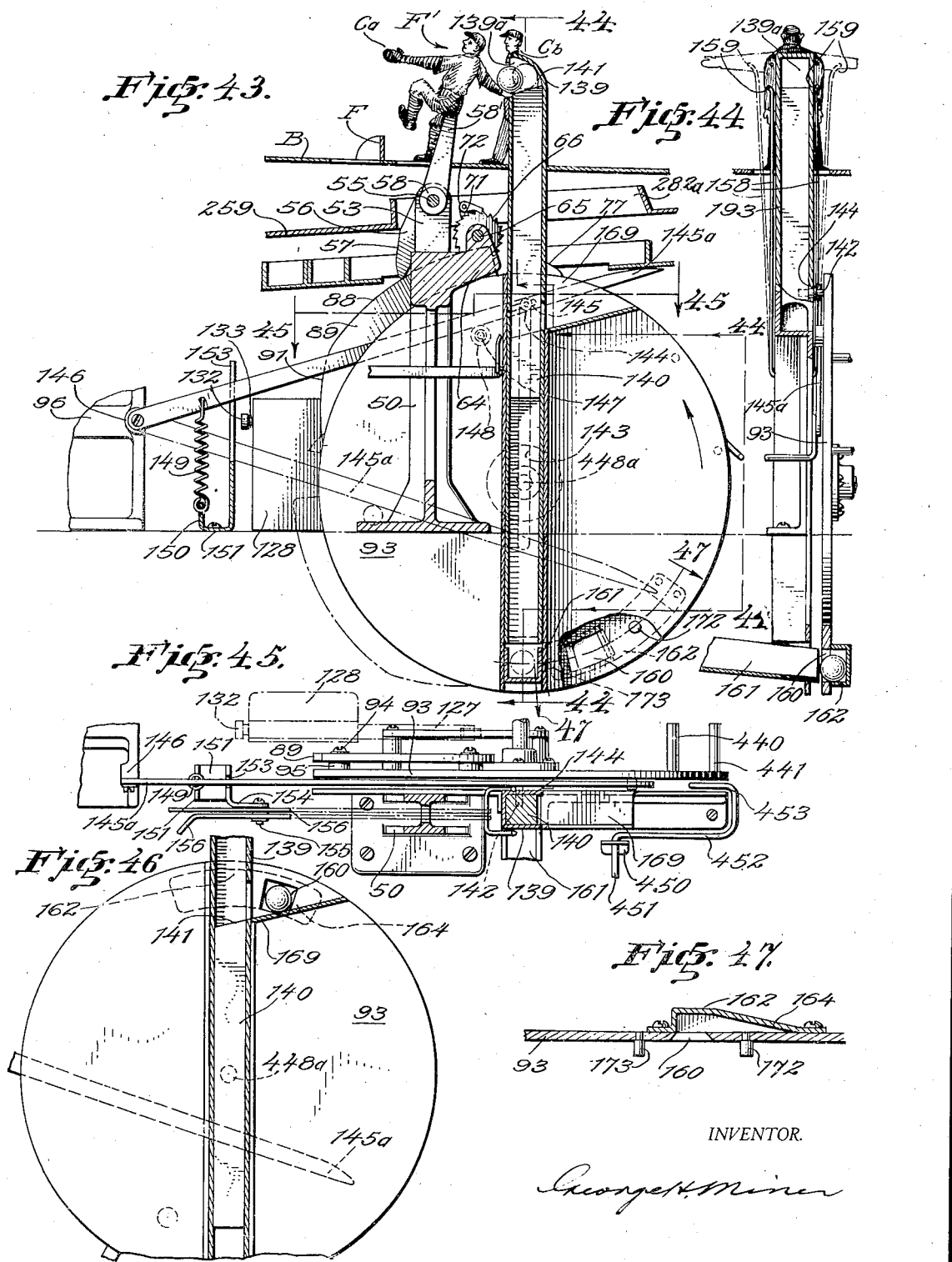

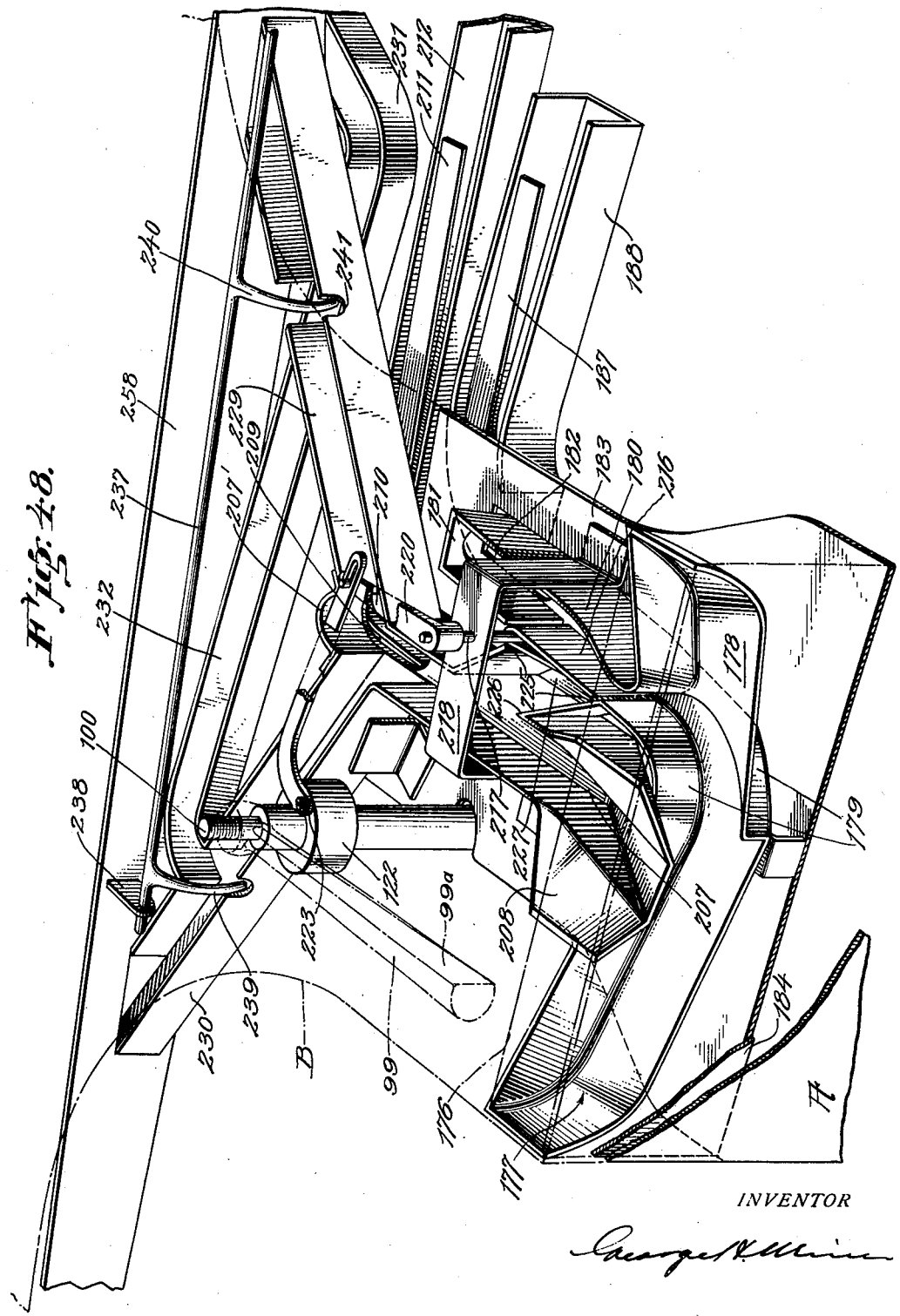

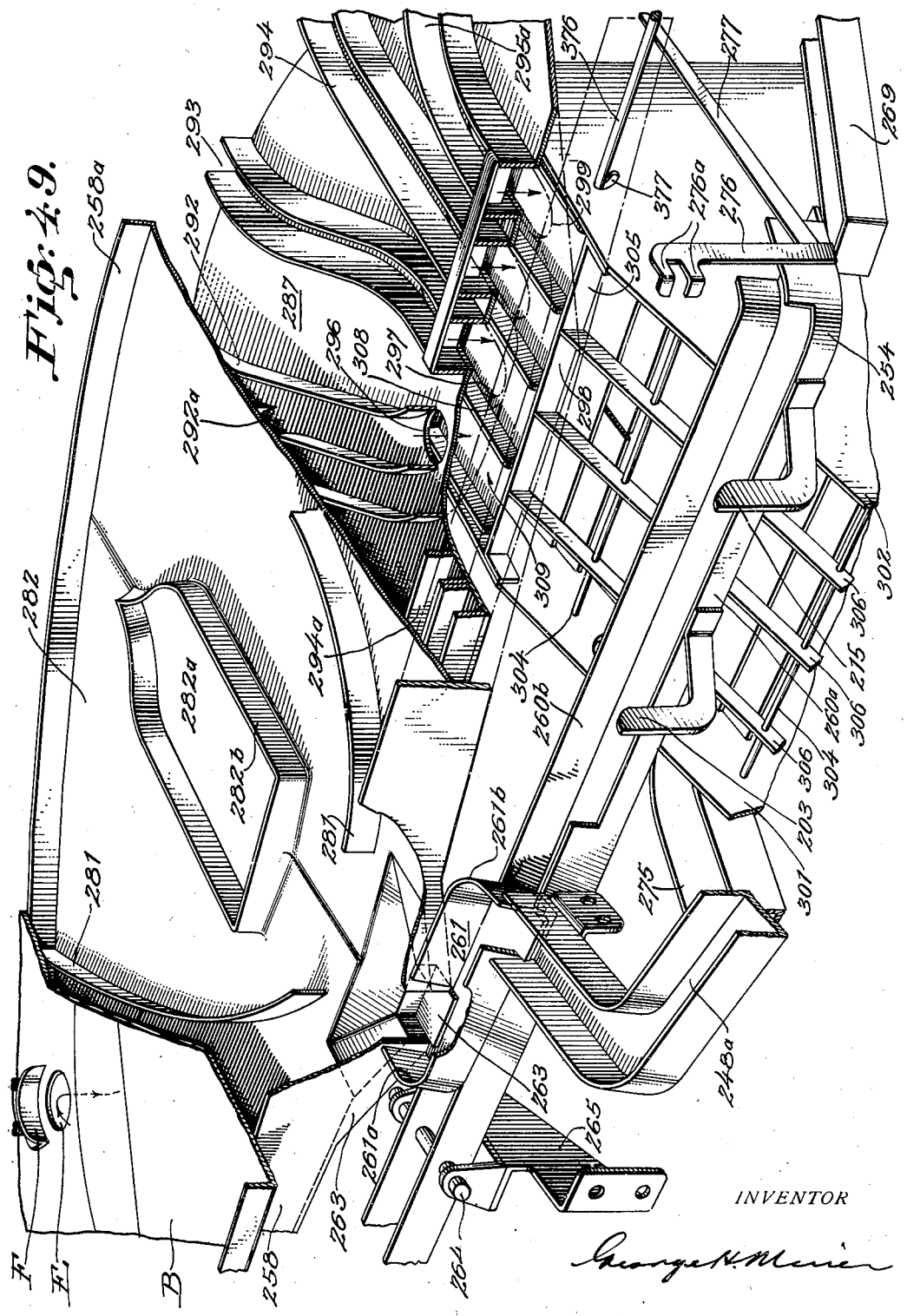

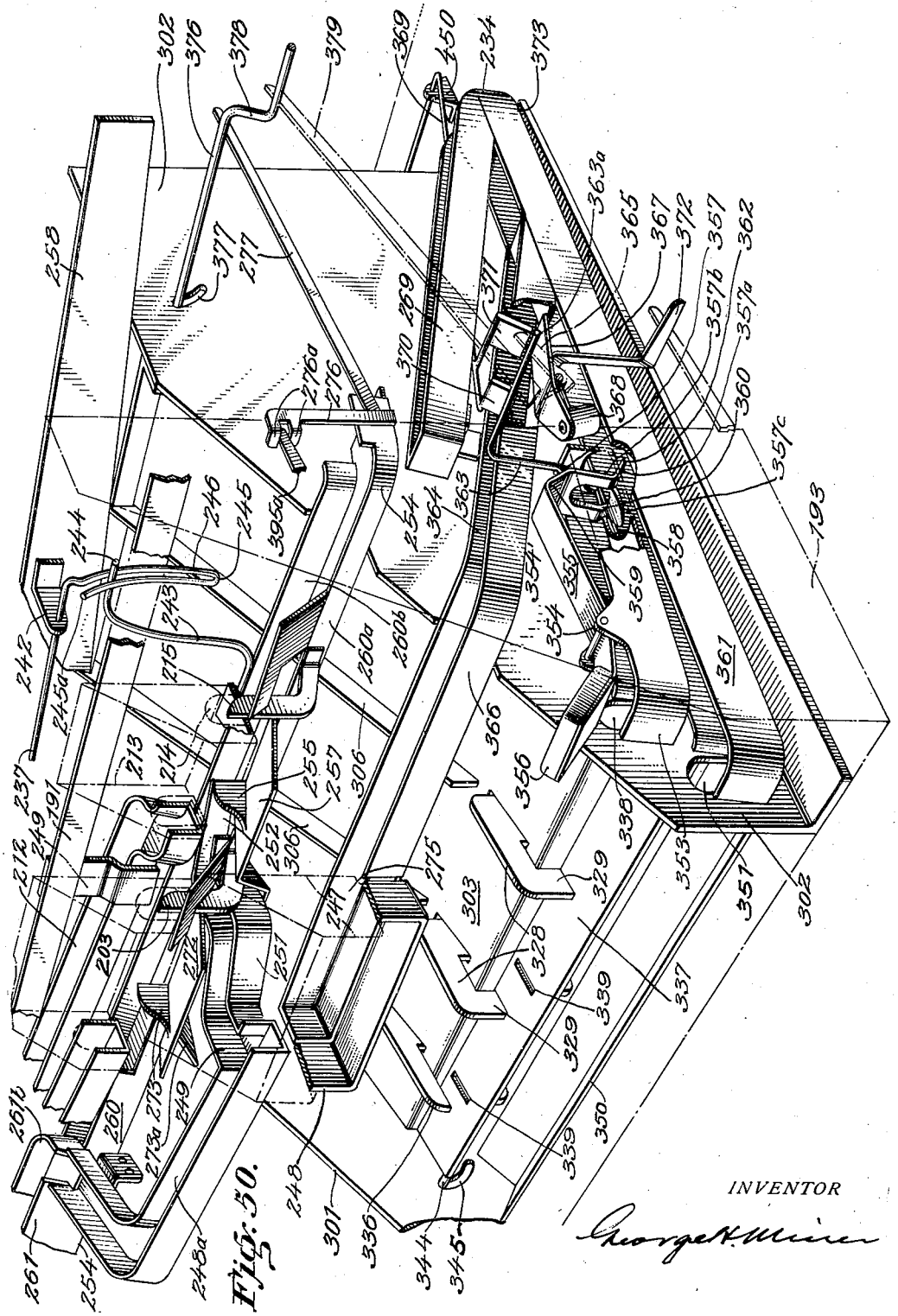

Dec. 15, 1936.  G. H. MINER  2,064,025
GAME APPARATUS
Filed Jan. 12, 1932  19 Sheets-Sheet 18
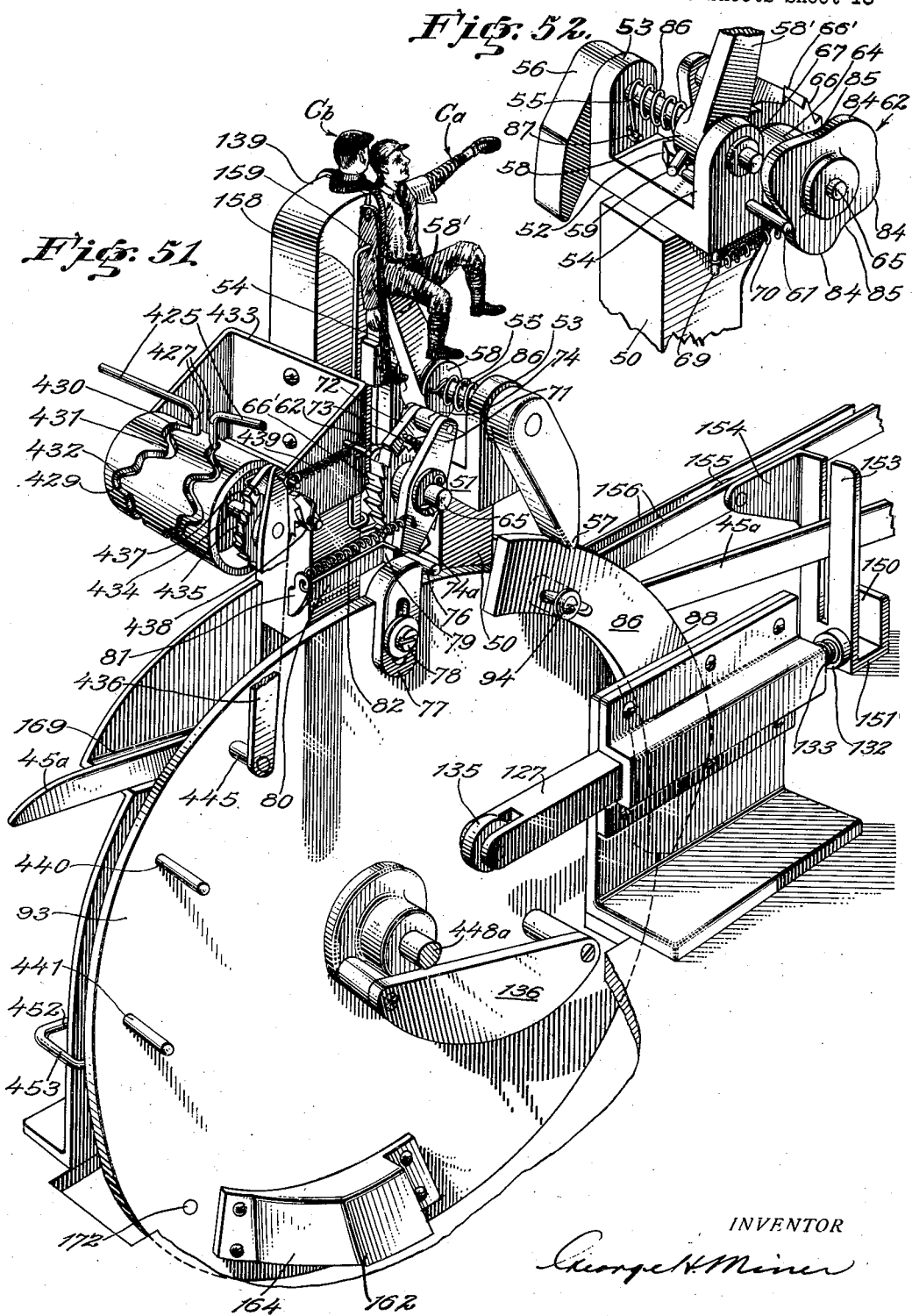

Dec. 15, 1936.  G. H. MINER  2,064,025
GAME APPARATUS
Filed Jan. 12, 1932   19 Sheets—Sheet 19
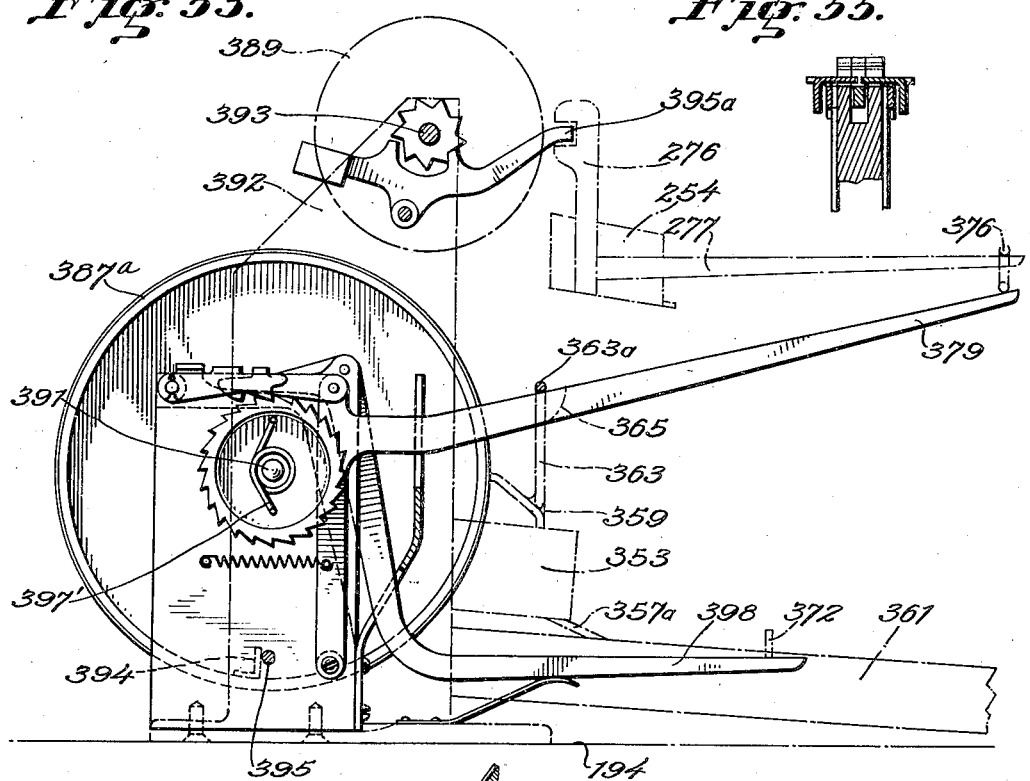
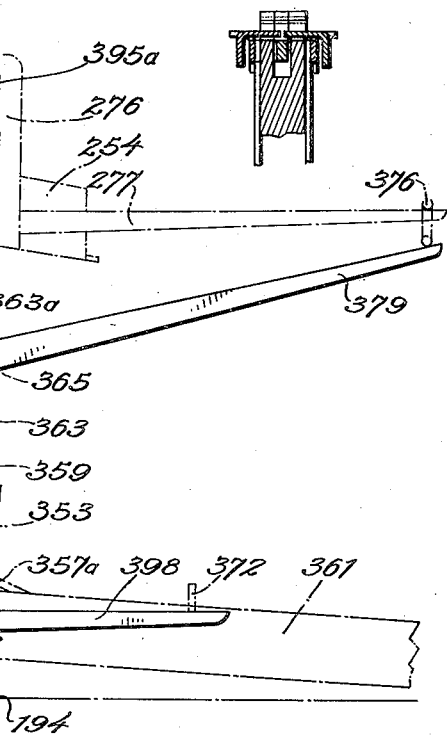
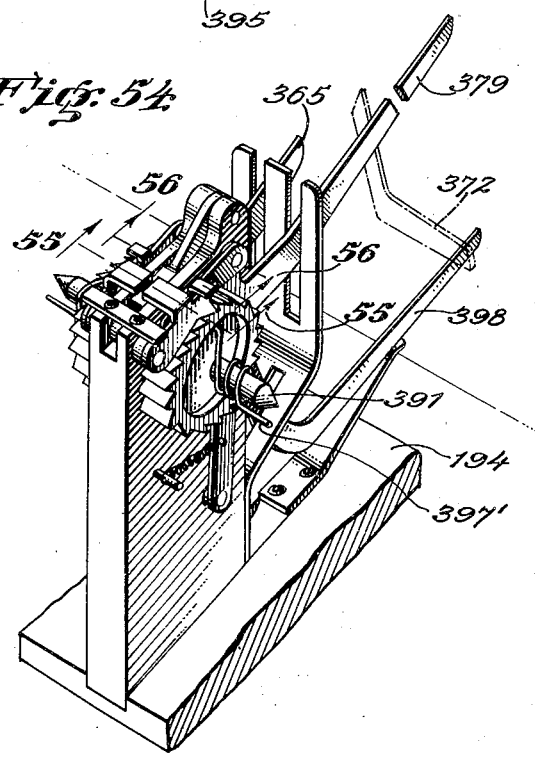
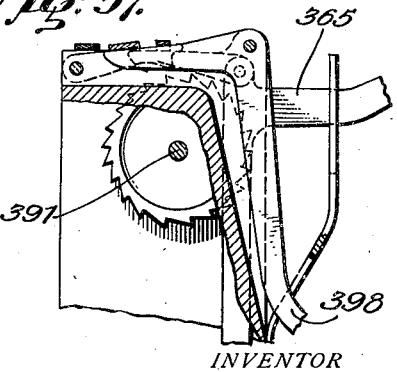
INVENTOR
George H. Miner Patented Dec. 15, 1936

2,064,025

UNITED STATES PATENT OFFICE 2,064,025

GAME APPARATUS

George H. Miner, Los Angeles, Calif., assignor, by mesne assignments, to Consolidated Patents Corporation, Chicago, Ill., a corporation of Illinois Application January 12, 1932, Serial No. 586,145

47 Claims. (Cl. 273—89)

This invention relates to game apparatus.

Among the many objects in view are included the following:

(1) The provision of game apparatus in which balls are adapted to be placed in motion on a playing surface and directed to positions thereon by novel and improved synchronized mechanisms.

(2) The provision of game apparatus in which novel means of a manually actuable character are employed and adapted to be controlled so as to coact with the aforestated synchronized mechanisms and enable the balls to be skillfully directed to predetermined places upon said playing surface.

(3) The provision of game apparatus having means by which balls can be pitched at regular intervals to a batting mechanism which may be made effective to bat a ball at the discretion of the player at any time during movement of a pitched ball.

(4) The provision of game apparatus in which means are employed that will automatically return the batting means to a starting position after said means has been actuated to bat a ball.

(5) The provision of game apparatus in which means are employed for automatically changing the line of movement of successively pitched balls, thus requiring greater skill in batting the ball to one or another of the predetermined ball receivers upon the playing surface.

(6) The provision of game apparatus in which means are employed for feeding balls to a pitching means and for utilizing power derived from the feeding means to drive the pitching means in operative time with the delivery of a ball thereto.

(7) The provision of game apparatus in which the batting means which is manually actuable to bat a ball cannot be reactuated to bat the same pitched ball.

(8) The provision of game apparatus having automatically controlled mechanism for successively pitching balls and for utilizing the pitched balls as a score indicator and for automatically stopping the pitching mechanism and returning the balls thus utilized to a ball feeding mechanism at the end of a playing period.

(9) The provision of game apparatus having co-ordinated motor controlled mechanisms from one of which balls are adapted to be delivered to the other of said mechanisms to be batted thereby and means by which both of said mechanisms will be automatically stopped upon occurrence of a predetermined event.

(10) The provision of game apparatus including a playing surface having one or more ball receiving orifices of a predetermined scoring value and one or more ball orifices of different scoring value, and means by which a projected ball traveling in the direction of an orifice of said predetermined scoring value will be reprojected in a direction to be received in one of the orifices of different scoring value.

(11) The provision of game apparatus having a playing surface provided with one or more ball receiving orifices of a predetermined scoring value and one or more orifices of a different scoring value, together with means for projecting a ball in a direction toward an orifice of one scoring value for possible reception of the ball therein and if not received therein, to be reprojected in a direction to be received in an orifice of a different scoring value and the received ball then moved from one place on the surface to another place thereon by the action of a subsequently projected ball.

(12) The provision of apparatus for playing a simulated game of baseball having means to enable practically, if not all regulation plays to be made.

Other objects and advantages will appear upon reference to the following description and the accompanying drawings, in which latter, Figure 1 is a perspective view of the apparatus.

Figure 2 is a perspective view of the apparatus, with parts broken away and parts removed for the sake of clearness.

Figure 3 is a plan view of the mechanisms illustrated in Figure 2 and showing the "strikes" and "balls" parts being out broken away for clarity.

Figure 4 is a central transverse section taken on line 4—4 of Figure 3.

Figure 5 is a perspective view of the counterbalance lever.

Figure 6 is a transverse section taken on line 6—6 of Figure 5.

Figure 7 is a transverse section taken on line 7—7 of Figure 3.

Figure 8 is a partial sectional view taken on line 8—8 of Figure 9, with parts in elevation.

Figure 9 is a transverse section on line 9—9 of Figure 3.

Figure 10 is a transverse section similar to Figure 9 showing the "out" trap in registering position.

Figure 11 is a transverse section similar to Figure 9 showing the "runs" trap in registering position.

Figure 12 is a partial transverse section similar to Figure 9, showing the "hits" registering unit.

Figure 13 is a perspective view of the "hits" denoting unit.

Figure 14 is a perspective view of the co-acting trip fingers.

Figure 15 is a transverse section taken on line 15—15 of Figure 19.

Figure 16 is a transverse section taken on line 16—16 of Figure 19.

Figure 17 is a perspective view of one of the ball distributing trays.

Figure 18 is a transverse section on the line 18—18 of Figure 17.

Figure 19 is a transverse section similar to Figure 7 showing the operation of the steps of the mechanism for denoting "hits."

Figure 20 is a detailed view of one of the circuit closers.

Figure 21 is a section taken substantially on line 21—21 of Figure 3.

Figure 22 is a detail view of another circuit closer employed herein.

Figure 23 is a view in side elevation of the batting mechanism with certain parts in section.

Figure 24 is a plan view of the mechanism shown in Figure 23.

Figure 25 is a view in front elevation of the mechanism shown in Figure 24.

Figure 26 is a section on line 26—26 of Figure 25.

Figure 27 is a side elevation of the pitching mechanism.

Figure 28 is a plan view of the pitching mechanism.

Figure 29 is a front elevation of the pitching mechanism.

Figure 30 is a transverse section taken on line 30—30 of Figure 27.

Figure 31 is a view partly in elevation and partly in perspective of the means for oscillating the pitcher figure.

Figure 32 is a plan view of the pitcher figure oscillating means.

Figure 33 is a view in detail showing the released position of the pitcher figure.

Figure 34 is a transverse section through portions of the batting and pitching mechanisms.

Figures 35 to 37 inclusive are schematic plan views of the pitching and batting mechanisms.

Figure 38 is a view illustrating the electric circuit for operating the mechanism.

Figure 39 is a plan view, with a portion of the playing field broken away, showing the "fielding" figures, shifting platforms and operating drum.

Figure 40 is a side elevation of the shifting mechanism with parts in section.

Figure 41 is a transverse section on line 41—41 of Figure 39.

Figure 42 is a schematic plan view of the cam drum.

Figure 43 is a view in side elevation of the mechanism showing the position of the ball in the act of being delivered to the pitcher figure after the ball is received from the reservoir.

Figure 44 is a vertical section on line 44—44 of Figure 43, showing the ball elevating and feeding chute.

Figure 45 is a section taken on line 45—45 of Figure 43.

Figure 46 is a section through the elevator shaft showing the manner of feeding the balls from the main cam wheel.

Figure 47 is a section on line 47—47 of Figure 43.

Figure 48 is a sectional perspective view of a portion of the mechanism illustrating the respective ball classifying chutes at the point of communication thereof with the batting means.

Figure 49 is a sectional perspective view of a portion of the mechanism illustrating the respective playing fields in their co-operative relationship to the waste chute.

Figure 50 is a sectional perspective view of the mechanism showing the respective chutes and traps, with parts broken away for clearness.

Figure 51 is a perspective view of the pitching mechanism.

Figure 52 is a sectional perspective view of the figure supporting bracket of the pitching mechanism from the opposite side of that shown in Figure 51.

Figure 53 is a view in side elevation of the dial mechanism.

Figure 54 is a perspective view of the detent mechanism for the dial mechanism.

Figure 55 is a section taken on the line 55—55 of Figure 54.

Figure 56 is a section taken on the line 56—56 of Figure 54.

Figure 57 is a view in elevation with parts in section of the dial resetting means.

In Figure 1 of the drawings is illustrated a conventional casing A having a playing surface B simulating a baseball field. Player figures C corresponding with the number of ball players comprising a fielding team are mounted upon said playing surface B. In the outfield section of the surface B is an arcuate series of orifices D, the respective horizontal axes of which diverge to a point approximately at the home plate B' of the diamond. These orifices open directly to the surface B so that certain balls used herein can enter same and be conducted to respective mechanisms for registering the plays as they are made. It will be noted that these orifices occupy in most positions in radial coincidence with certain ones of the player figures, whereby it will be made to appear that a ball that has been hit into the outfield has not been timely fielded and that said ball has passed a particular player figure and has successfully executed a certain play. It will be further noted that some of said player figures which co-act with certain of said orifices are mounted for life-like movements as though their bodies were swaying to and fro, like those movements which are characteristic of players occupying fielding positions on a baseball diamond. The arrangement is such that a batted ball, the direction of movement of which is to the right of a particular player figure can be interrupted by an unexpected movement in a lateral direction of said figure as tho the figure was attempting to field the ball. At a point in the surface B in front of each of said player figures is an opening E, the axis of which is vertical and co-acting therewith and formed on each of figures, (except the pitcher figure and the catcher figure) is a curved deflecting member F which perchance can obstruct the movement of a batted ball and cause same to enter an opening E in advance of said member.

The apparatus is of the class employing balls formed and adapted to be pitched from a figure Ca to be struck by batting means G, the latter disposed on the playing surface B and adapted to be actuated to contact a ball and reproject same toward the pitcher figure in order that it can enter one or another of the orifices D and E.

The front wall of the casing is formed with a downwardly and forwardly inclined face A' arranged in the line of vision of an operator standing in front of the apparatus. This face is formed with display openings H, I, J, K, L, M and N constituting a score board for denoting "balls", "strikes" and "outs" and for providing a temporary record of "runs" and "hits" and for visually depicting players running the bases of the playing surface.

Mounted within the casing A is a vertical bracket 50 having a U-shaped yoke 51 at its upper end which can oscillate about the axis of a vertical pivot pin 52. Said pin passes through the base of said yoke and has connection with said bracket 50. Journaled in the ears 53 and 54 of the yoke is a rock-shaft 55 to which is secured a releasing lever 56, beveled to provide a cam edge 57. Fixed to rock with the shaft 55 is an arm 58' which extends from the hub 58 having a stop pin 59. A pitcher figure Ca is mounted on the arm 58', the right hand arm of which is normally extended downwardly and rearwardly and same is provided with a cup 60 to receive a ball from an "umpire" figure Cb. To the outside of the ear 54 and disposed below the shaft 55 is a pin 61 which rides an irregularly shaped cam 62. Rearwardly of the arm 58' and mounted on a rib 63 which extends from the bracket 50 in a position flush with the upper end of the bracket, is a lug 64. Journaled in said lug is a shaft 65 to the outer end of which is secured the aforementioned cam 62. To the other side of said lug 64 and secured to shaft 65 is a ratchet wheel 66, the same provided with seventeen peripheral teeth 66'. Disposed between the ratchet wheel 66 and the lug 64 is a thrust washer 67. To the underside of the lug 64 and at a point where it overhangs the rib 63 is secured a pin 68 and attached to the underside of the yoke 51 is a pin 69. Between said pins 68 and 69 is a tension spring 70 which serves to hold the pin 61 in bearing engagement with the cam 62. Rotatably mounted beside the wheel 66 is an oscillating lever 71 to the upper end of which is pivoted a pawl 72 which engages with the teeth 66' under the tension of a spring 70. A spacing collar 74 is disposed between the pawl 72 and the lever 71. Pivoted to the lug 64 to engage the teeth of ratchet wheel 66 is an escapement pawl 74a, the same urged in engagement therewith by a flat spring 75. To the lower outside end of the lever 71 is secured a pin 76 adapted to be engaged by a cam lug 77 which is adjustably mounted to the side of the main cam wheel 93 as at 78. The pin 76 is extended to a position to the other side of the lever 71 where it engages a stop ear 79, the latter forming a part of a small U-shaped bracket 80. The rear portion of this bracket forms an ear 81 and between said ear and the lever 71 is a tension spring 82 which serves to hold the pin 76 against the stop ear 79. The edge 83 of the cam 62 provides four raised portions 84 and a corresponding number of depressions 85, but it will be noted that no two of said portions 84 or any two of said depressions 85 are alike. It will also be observed that said portions 84 and said depressions 85 are so correlated to each other that portion 84 which extends the greatest distance from the axis of the cam is diametrically opposite that one of the depressions which terminates at a point nearest to said axis of the cam, thus respectively providing for minimum and maximum points of throw of the cam. This cam causes the co-acting pin 61 to respectively move forwardly and rearwardly along a normal line through what may be called a neutral or central position as shown in Figure 28. This movement of the pin 61 causes the yoke 51 to oscillate about the axis of the pivot pin 52 between the two extreme positions b and d respectively as shown in Figure 32. This provides a differential oscillating motion as the cam functions and same results in movement of like character being imparted to the arm 58 on which the figure Ca is mounted. As a result thereof, the angle of the arm 58 will change constantly to insure successive delivery of the balls to the batting mechanism along respectively different paths with respect to a medial line drawn from said batting mechanism to the pitcher figure and crossing the "home plate" of the simulated baseball diamond as will be understood on reference to Figures 35-37. This movement of the ball is almost incalculable to the operator who thereby finds it difficult to hit the ball to the position of his choice upon the surface B. As the pitcher figure is about to throw the ball, the cam lug 77 timely functions on the main cam wheel to engage pin 76 and thus force the lever 71 to move about the axis of the shaft 65, with the result that the pawl 72 turns the ratchet wheel for a distance of two teeth. This imparts rotation to the shaft 65 and the cam 62 and causes partial turning of the pitcher figure as shown in Figure 31. Because of the uneven number of teeth on the ratchet wheel, it follows that on a complete revolution of the wheel, the pawl 72 will next engage a tooth between those teeth which it previously engaged. This means provides for a change of adjustment of the ratchet wheel, for the distance of one tooth after each complete rotation thereof, and in consequence thereof, there is no prescribed cycle of movement of the cam, known to the operator and it is quite difficult for him to figure the precise movement which the pitcher figure will describe.

The release of the pitcher figure is accomplished as follows: Extending about the shaft 55 is a torsion spring 86, one end of which is secured to the arm 58', while the other end thereof is secured to said ear 53 by means of a pin 87. In this manner, the spring operates to swing the arm 58' forward and with the result that the ball will describe a parabolic curve as it leaves the pitcher figure. This action of the spring is resisted by the lever 56 which occupies a position substantially in line with the arm 58'. The lower corner 57 of the lever 56 is caused to travel on the edge 88 of a cam surface 89, the latter fastened to the outer edge of the cam wheel 93. The forward or approaching end 91 of the lever tapers from a point at the circumference 92 of the cam wheel 93 to a point at the edge 88 and at an angle of about 30 degrees. Said surface 89 is adjustably fastened to the wheel 93 as at 94 so that it can be turned annularly to one of several respective positions until timed adjustment of the arm is had whenever desired. The distance between the cam 89 and the wheel 93 is maintained by spacing collars 95. The rise of the cam 89 is calculated to bring the pitcher figure back to a tilted position far enough to receive a ball from the umpire figure, and this movement is timed to become effective immediately after the resetting operation of the batting mechanism proceeds to function, and to complete the ball receiving position of the pitcher figure as soon as the batting mechanism is fully reset. The opposite end 95a of the cam surface 89 is related to the first said end so that the arm 58' will be released the instant the motion of the cam is completed. Upon leaving the abrupt end 95a of the cam surface 89 the pitcher figure is suddenly tilted by the spring 86 and said figure moves forward in a manner to cause quick projection of the ball from the cup 60.

The arm 58' extends through a slot 58a in the playing surface B and its movement in a forward direction is limited by the stop pin 59 which comes against the co-acting pin 61.

Upon reference to Figure 31, it will be appreciated how the desired close timing between the turning of the pitcher figure as initiated by the cam lug 77 and co-acting pin 76 and the release of the lever 56 from the abrupt end of the cam surface 89 is effected. On reference to Figure 33 it will be seen that the arm 58' at this position of the cam surface will have assumed a released condition, at which time, a sudden forward impulse is given the pitcher figure to effectively discharge a ball from the cup 60. The dot and dash lines of the yoke 51 in Figure 32 indicate the variable motion that is set up in the pitcher figure as induced by the action of the cam 62. When the yoke 51 is turned by the cam 62 as shown in Figures 31 and 32, the end of the lever 56 functions over the radius 88 of said cam 89, and by this motion of the lever 56, the shaft 55 is partially rotated. As a result thereof, the spring 86 is acted upon a proportional degree. In this manner, the tension of the spring is affected and it is because of this peculiar functional characteristic that the force exerted upon the pitched ball is not only influenced, but there is created a measure of uncertainty in the mechanical result attained that compels the operator to exercise his highest degree of skill if he is to succeed in hitting the pitched ball to an intended position on the playing surface.

The batting mechanism employed to coact with the aforestated pitching mechanism includes a bracket 96 mounted within the casing A, in which bracket, the rock shaft 97 is journaled. The forward end of said shaft passes through the wall of the casing and is provided with a manipulating handle 98 adapted when depressed by hand to impart rocking motion to the shaft, whereby power will be transferred therefrom to a non-metallic bat 99 which overlies the playing surface B at a position immediately to the left of the "home plate" simulating part of the playing field. It is adapted to swing around a vertical axis and is disposed very close to the playing surface so that its long flat side 99a can coact with a ball thrown from the pitcher figure. Its position with respect to the home plate of the simulated diamond is also such that its lane of movement is across the home plate as will be understood on reference to Figures 35–37 inclusive.

The bat 99 is secured to the upper end of a vertical shaft 100 which passes through the playing surface B, thence into the casing A where it is supported in bracket 96, and has its lower end mounted in a step bearing 102 forming part of said bracket. It will be noted that the inner end of shaft 97 is journaled at 102a in said bracket 96. Coiled about shaft 97 is a spring 103 having one end attached at 104 to a bracket 96a and its other end secured to the shaft 97 at 105 thereby causing the shaft to turn in a clockwise direction. Rigidly mounted on the shaft 97 is a finger 106 adapted by the action of the spring 103 to be normally advanced against a stop pin 107 on the bracket 96. Pivoted at 108 to bracket 96 is a lever 109 having a depending arm 110 and a vertical lug 111, the latter disposed adjacent to the bat supporting shaft where it coacts with the flat side of a pin 112 which extends radially from said shaft. The depending arm 110 terminates at its lower end in a lateral nose 113 which freely bears against one face of the finger 106, this position of said nose being normally maintained by the spring 117 which yieldingly connects the arm 110 with said bracket 96.

At a point above the portion 118 of the bracket 96 and secured to said shaft 100 is a collar 119 from which the radial pin 112 extends. Beneath said portion 118 and secured to the shaft 100 is a similar collar 120. It will be noted that a coil spring 121 encircles a portion of said shaft and that one end thereof is secured to the shaft, while its opposite end is attached to the bracket 96, the purpose of which being to cause a counter-clockwise movement to be imparted to said shaft. Normally the spring 121 is held in a wound condition by reason of the fact that pin 112 is engaged against the lug 118.

A collar 122 is also secured to the shaft 100, the same carrying a link 123 which forms part of a score indicator to be described presently. As will clearly appear as the description proceeds, the batting mechanism is adapted to be rendered free for operation by the action of a coin when deposited in the coin controlled means of the apparatus. Because of the functional characteristics of the coin controlled means and its relationship to the batting mechanism, the operator may, at such time as he elects, cause the lug 111 to be released from the pin 112 by depressing the handle 98. When lug 111 is depressed from the path of said pin 112, the movement of the bat shaft is placed beyond control of the operator, thus making it necessary for the operator to closely observe the movements of the ball pitching mechanism if he is to be successful in intercepting the movement of the pitched ball by timely actuation of the bat. Therefore, and depending upon the extent of skill exercised by the operator, he may either bat the ball safely and place it at a desired place upon the playing surface, or he may possibly miss the ball. When once the bat is released, it cannot be reset manually. This action is desirable because of the fact that the entire batting mechanism functions in time with synchronized operation of the pitching mechanism, it being possible to effect but one release of the bat for each ball throwing operation of the pitching mechanism. I shall next describe the means employed whereby, after the batting mechanism has been manually released, it will be automatically reset during the interval in which the pitching mechanism is preparing to pitch the next ball.

Movable with the shaft 100 is a gear pinion 124 which meshes with the teeth of a reciprocable rack bar 125 mounted in the bracket 96.

When the shaft 100 is released to bat a ball, the rack bar 125 coacts with a resetting means 126, the same having a sliding bar 127 which operates in the bore 127a of a casing 128. Said bar is formed with a long rod 129, preferably cylindrical, and as shown, same slides through an aperture 130 in the end wall 131 of said casing 128. Exteriorly of said wall, the rod 129 is provided with a head 132 which is aligned with the aforementioned rack bar and disposed in the path of movement thereof. A buffer spring 133 extends about the rod and is interposed between the head 132 and said wall 131. Within the casing 128 and extending around the rod and positioned between the inner face of said wall 131 and the shoulder 125a of bar 125 is a coil spring 134, the normal function of which being to move the bar to the full line position shown in Figure 23. The end of the bar 127 which is exposed from the casing 128 carries a roller 135.

A cam 136 which forms part of the main operating or power transferring unit of the apparatus coacts with the roller 135 and serves to gradually force the bar 127 in the direction of the correlated rack bar 125, carrying the latter with it as soon as the head 132 catches up with the adjacent end thereof. In consequence thereof, power is transferred to the pinion 124 and the bat shaft thereby automatically returned to its initial or reset condition ready for the next operation. When the bat shaft is released, the pin 112 is moved to a position of 180°, at which time it contacts a rubber buffer 137. Further movement of the shaft is prevented as the buffer is attached to the bracket in which said shaft is journaled. Also at this resetting interval, it is to be observed that all others of the co-acting parts of the batting mechanism are automatically reset to the full line positions shown in Figures 23, 24 and 25. A lug 138 on bracket 96 is disposed in the path of movement of the finger 106 so that downward movement thereof is effectively limited.

The mechanism for automatically feeding balls to the pitching mechanism includes a vertically disposed elevator shaft 139, the lower end of which terminates adjacent to the base of the main cam wheel 93. The upper end of said shaft extends above the playing surface B where its open front portion 139a coacts with the ball receiving cup carried by the pitcher figure as shown in Figure 43. A ball to be pitched is conveyed to the upper open end of the shaft 139 by an elevator 140, the upper end of which is inclined downwardly at 141 in a direction toward said pitcher figure. The lower end of said elevator extends to a point about midway between the respective ends of shaft 139. Extending from the lower end of the elevator is a pin 142 which rides in an elongated vertically disposed slot 143 in the side wall of the shaft. Exteriorly of the shaft 139, the pin 142 supports a roller 144 which operates in a slot 145 in a lever 145a. Said lever 145a has one end pivoted to the bracket 96 of the batting shaft, a boss 146 being employed for this purpose and disposed intermediate the extreme points of movement of the lever 145 as it raises and lowers the elevator. Pinned at 147 to cam wheel 93 is a roller 148, the same disposed immediately in advance of the releasing end of the cam 89 or at a point which marks the maximum limit of upward movement of the elevator which occurs while the releasing lever 56 of the pitcher figure is still riding on the edge 88 of its cam 89 and while said figure is in a position to receive a ball from the umpire figure. This occurs when the cam 89 has about completed half of its stroke. The lower position is shown in dot and dash lines in Figure 43. For retaining the lever 145a in contact with the roller 148, a tension spring 149 connects the lever 145a with an ear 150 which latter is bent upwardly from the base portion 151 of a bracket 152.

The rear face of the bracket 152 is carried up past the lever 145a when the latter is in its raised position and same is formed with a slot 153 to guide the lever during its movement. At the upper end of the bracket 152 is an ear 154 and pivoted thereto at 155 are two horizontal links 156—156 which respectively extend to the "strikes" and "balls" traps of the apparatus where their outer ends are pivoted at 157 to the vertical links of said traps. The right hand link operates the left pivoted arm of the "umpire figure" by means of the connection 158 which has pivotal connection at 159 with said arm. The lower end of the connection 158 attaches to the lever 156, as shown. The left hand link functions in like manner to actuate the right arm of the "umpire figure". The respective connections 158 occupy positions at the respective sides of the elevator shaft 139 and said connections converge relatively so as to meet the levers 156 at their lower ends. When the ball trap is functioning, movement of its link results in the left arm of the "umpire figure" being raised, and in a similar manner, the right arm of the figure is made to function upon actuation of the strikes trap.

At a point below the elevator shaft 139 is the terminus of what will be hereinafter called the reservoir chute. When the pitcher figure has been tilted to a position to receive a ball from the elevator, an opening 160 in wheel 63 coincides with the outlet 161 of the reservoir chute. Balls in the chute that have rolled to said opening 160, are now free to discharge through the latter and into a pocket 162 on the wheel 93, said pocket having one of its walls inclined toward an adjacent flat side of the wheel as shown at 164, and provided with an open side which confronts the opening 160. When the elevator is in the position shown in Figure 43, the ball will have been received in the pocket 162. Rotation of the wheel in the direction of the arrow in Figure 43 carries the ball to a position above the horizontal axis of the wheel so that the open side of the pocket 162 will be presented at the sloping hopper 169, at which time, the ball is transferred thereto, thence deposited upon the beveled upper end of the elevator 140. Positioned adjacent to the opening 160 and in front of same is a pin 172, while, and at the rear end of said opening relative to the direction of rotation of the wheel 93 is a pin 173, the latter and the former serving as adjuncts to the "outs" traps as will appear presently.

Upon depositing a coin in slot 174, all of the coordinated mechanisms of the machine are started in operation. The bat 99 may now be manually controlled by depressing the handle 98 and proper manipulation thereof will result in a pitched ball being hit into the outfield of the playing surface B. Failure to contact the ball with the bat may result in the ball passing to the left hand side of the home plate and will be recorded as a "ball". Should the ball pass to the right hand side of the home plate it will also be recorded as a "ball". Should the operator fail to contact the ball when actuating the bat, this will be automatically recorded as a "strike".

Should the bat when actuated contact a pitched ball, the latter will be reprojected back in the direction from whence it came. Should it enter one of the orifices E, it will be recorded an "out". But should it succeed in missing these orifices, it may enter one of the orifices D as indicative of the scoring value of the hit made. If a ball is projected inside the foul lines of the playing surface it will be recorded a hit. Should it be projected outside the foul lines of the playing surface, it will enter an end orifice in the out field and be recorded a "foul", or strike on the batter. When two such foul strikes have been recorded, all balls projected into the last said territory of the playing surface will be recorded as "balls" as in the regulation game of baseball. Should the operator fail to manipulate the bat as the balls are pitched, the pitching mechanism will continue operating until "three outs" are registered, at which time, the operation of the machine will automatically stop.

Upon reference to Figures 2, 3 and 7 of the drawings, and assuming that the respective mechanisms of the machine are in operation, it will be appreciated that should the operator neglect to operate the bat, a pitched ball may pass either to the left or the right of the "home plate" and recorded as a "strike". It is also possible for the ball to directly cross the "home plate" and be registered as a "strike". Immediately in back of bat 99 is a hood 175, the same curved toward the batting mechanism and formed in the playing surface B to coact with the hood is an elongated slot 176. Certain balls passing through said slot are received in a hopper 177, the left hand end of which is inclined downwardly to the inclined right hand end 178 of said hopper and is disposed at a lower elevation than the floor of said right hand end, there being a gradual curve at 179 in said left hand end of the hopper. In consequence thereof, balls are prevented from congesting the end 178 and are made to follow the curve 179 and pass into the right angle extension 180 of said hopper. This extension continues forwardly to a point in horizontal alignment with the bat shaft, at which point, a wall 181 stops the ball. An opening 182 in the inclined floor of extension 180 allows the ball to drop onto a counter balanced trap 182a disposed below said opening. Beneath the surface B is an inclined platform 183 which terminates at one end forwardly of the vertical axis of said bat shaft. The opposite end of the platform has a vertical flange 184 which is secured to the front wall of the casing A and provides a support upon which the various chutes, gates and traps are mounted. The opening 182 passes through the floor of platform 183 and communicates with trap 182a, the latter being in the form of a flat plate having flanges upstruck therefrom and pivotally connected at 185 at the forward end of said opening. A weighted arm 186 normally urges the trap in a direction to cover the under side of said opening.

Extending forwardly from the trap 182a is an arm 187 which is disposed in the channel of a ball chute 188 beneath the front end of platform 183. The chute extends downward at a gradual inclination to a "balls" denoting pocket 189, the latter forming part of a score board organization 190 from which the record of plays made can be seen. This organization includes a supporting strut 191 disposed between plates 192 and 193. The lower edges of said plates are secured to a base plate 194. The rear vertical edges of plates 192 and 193 extend between the base plate 194 and the under side of the playing surface B. Extending between plates 192 and 193 are three relatively stepped horizontal bars 195, 196 and 197, the same spaced apart from each other. To one side of plate 193 and disposed between bars 195 and 196 is the "balls" denoting pocket 189. The chute 188 extends between the pocket 189 and trap 182a and is disposed at an elevation slightly lower than said trap. It will be noted that the respective pockets for denoting "balls", "strikes" and "outs" are in registration with respective openings H, I and J in the downwardly and forwardly inclined score board portion of the casing A so that all balls contained therein will be clearly visible while the machine is being operated.

The left hand end 198 of pocket 189 is formed with an opening 199 through which balls may enter. The trap 182 rearwardly of its pivotal mounting supports a swinging link 200 which is connected to the "balls" denoting arm of the umpire figure. The right hand end of said pocket has a similar opening 202 and at 203 is a detent to coact with means for causing the balls to be reconveyed to the ball reservoir of the machine. The bottom of pocket 189 is normally closed by a counter balanced trap 204, hinged to the forward end of said pocket. The front face 205 of the pocket is recessed behind the bar 196 to accommodate a counter balancing weight 206 which extends forwardly from the trap 204. As the construction and operation of the "strikes" and "outs" pockets are similar to the construction and operation to the "balls" pocket, it is thought that a description of one will fully suffice for all.

It will be appreciated that if a pitched ball rolls to the left of the home plate, it will be considered a "ball" and that when rolling beneath the hood 175 it will drop through the slot 176 and be delivered to the hopper 177. From the hopper, said ball proceeds to the opening 182 and rolls to the trap 182a, overbalancing the latter and allowing the ball to discharge therefrom. The ball then rolls along arm 187 and depresses said arm to thus actuate the link 200 and cause motion to be imparted to the left hand arm of the umpire figure as indicative of a "ball". The arm 187 is of a length calculated to be held down by a rolling ball a sufficient period of time to enable the movements of the arm of said figure to be discerned by the player. The ball then proceeds to the pocket 189 through chute 188. The aforementioned ends 198 and 201 are spaced apart a sufficient distance to accommodate four balls, and it will be noted that as the balls accumulate in said pocket 189, they will be visible to the operator.

Should the pitched ball be delivered to the right hand side of the home plate beyond the outside corner thereof, it will pass to the end 178 of hopper 177, from whence it is conducted along the curved portion 179 thereof, thence delivered to the aforementioned pocket 189.

Should the pitched ball traverse any part of the home plate, a "strike" is counted against the batter and the ball then moves to the slot 176 in the surface B through which it drops into hopper 207. This hopper extends perpendicularly from the wall 184 and is disposed rearwardly of the bat shaft 100 and same inclines downwardly toward the platform 183. Its end 208 opens directly to the slot 176, so that balls falling through said slot will discharge into said hopper. The curved end 207' of the hopper 207 acts to prevent the travel of the balls at a point directly over an opening 209 beneath which is a trap 210 for denoting "strikes" and onto which the balls are adapted to be discharged. This trap is similar to trap 182a and is provided with an arm 211 which extends into the chute 212. This chute extends forwardly from said trap 210, is curved at 210a and thence continues to the "strikes" pocket 213. This last named pocket is disposed between the pocket 189 and said plate 192, and the opening 214 at the right hand end of same is closed by a "strike" controlling detent 215 similar structurally and functionally to the detent 203. The trap 216 closes the bottom of the pocket 213, and as shown, the length of the pocket is designed to accommodate three balls in longitudinal row formation.

Assuming now that an operator depresses the handle 98 and the bat is moved to a position of about 180°, should the bat fail to contact the ball, the latter proceeds to the slot 176 and is counted a "strike", the ball being by-passed from the "balls" chute to the "strikes" chute, provided, however, that the ball is a "ball" technically. Should the ball be considered a "strike" technically, it will be received in the manner aforestated. The ball by-passing means comprises a gate 216 mounted on a shaft 217, the latter journaled in a bracket 218. The gate 216 above the shaft 217 is provided with a lever 220 having pivotal connection with the link 123. Disposed between the bracket 218 and the playing surface B and secured to the bat shaft 100 is the aforestated collar 122. The link 123 is pivoted at 223 to said collar and same is disposed at the right hand side of the bat shaft when gate 216 is in its normal position. The link is curved at 224 to clear the shaft when the link is swung 180°. At its point of connection with the lever 220, said link is slotted to allow for limited motion thereof before acting upon the lever 220. It will be noted that upon swinging movement being imparted to the bat, the gate will swing against the right wall of the chute 180 to thus provide an opening 225 in the chute which directly communicates with the "strikes" chute 207, the latter having a similar opening 226 just beneath the bracket 218. These openings intercommunicate with each other through chute 227, (Figure 8). A ball that is missed by the bat finds its way to the chute 180 and is deflected by the open gate 216 and thereby discharged to the "strikes" chute by way of the opening 225, passage 227 and opening 226 and is finally denoted a "strike". Balls passing into the slot 176 as "strikes" pass under the catcher figure and are discharged into the hood 175. As aforestated, a ball hit by the bat will be reprojected onto the playing surface and if not received in one of the openings E may continue its movement and be received in one of the aforementioned outfield openings.

It is a rule of baseball that after two "strikes" are counted against a batter, all balls hit into "foul" territory are counted as "fouls". In Figures 2 and 3, also Figure 48 of the drawings, the discharge end 228 of the "strikes" chute 207 is correlated to chutes 229 and 230 to receive "foul" balls, said chutes being inclined in an upward direction toward the front edge of playing surface B to coact with the "foul ball" orifices at the right and left hand ends respectively of the out field portion of said playing surface.

All "strike" balls entering pocket 213 are visible from aforementioned window I. When two balls indicative of "two strikes" are received in said pocket, all "foul balls" thereafter made, instead of being received in said pocket are diverted by a "foul" or "waste" chute 231 to a ball reservoir. The chute 231 has an inclined member 232 disposed parallel to the front edge of the playing surface B, and same also includes a perpendicular member 233. The upper left hand end of member 232 has connection with the chute 229 and is curved into the member 233 at a point below chute 229. The member 233 inclines downwardly and rearwardly and joins the reservoir chutes 234 at 235, the construction being such that the opening 236 allows the ball to drop into said chute 234. Immediately above the member 232 is a long shaft 237, one end of which is journaled in a bracket 238. Adjacent to the bracket and disposed opposite the entrance to the member 232 is an arcuate finger 239 which forms part of said shaft 237. A similar finger 240 is secured to said shaft and coincident therewith in the left hand wall of the chute 229 is an opening 241. The fingers 239 and 240 extend into the respective chutes. The shaft 237 is mounted in a bracket 242 in back of the "strikes" pocket 213, and is adapted to be rotated by actuation of the "strikes" trap, whereby when two strikes are indicated, the fingers 239 and 240 are rotated inwardly relative to said chutes 229 and 230. In this manner, balls from the "foul" orifices in the playing surface upon entering the chutes will be deflected into the waste chute 231 for return to the reservoir, see Figures 3 to 9 inclusive of the drawings. Upon reference to Figure 9 it will be noted that the "strike" trap is held close normally by its counter weight. When one ball enters the pocket 213, denoting "one strike", the weight serves to maintain a closed condition of said trap. However, when two balls enter the same pocket as indicative of "two strikes", the trap is partially tipped. Secured to the right hand end of the trap is an upwardly extending wire 243, the upper end of which is bent to form a short horizontal arm 244. Depending from the end of the shaft 237 is an arcuate member 245 which is bent to provide an arm 245a and a lever 246. Between the arm 245a and lever 246 is extended the arm 244 of the strike trap wire 243. Said lever 246 rotates about the axis of the shaft 237 so that its arc of movement is about the hinge point of the strike trap. Downward movement of the "strikes" trap causes the arm 244 to travel in the space between the arm 245a and the lever 246 to thereby move the shaft 237 in a clockwise direction. This results in motion being imparted to the fingers 239 and 240, and in consequence thereof, the balls entering the respective chutes 229 and 230 will be deflected to said chute 231. But the partial tipping of the trap is not sufficient to discharge the balls from the pocket 213 as the trap is so balanced that the combined weights of three balls is required to cause same to fully descend.

Upon referring to Figures 2 and 3 of the drawings, it will be appreciated that the pocket 247 which receives and displays the balls that are indicative of "outs" is disposed at a horizontal level relative to the pockets 189 and 213 that a line drawn between said pockets passes centrally through the pocket 247. Said pocket is similar to the pockets 189 and 213 and is closed at its bottom by a pivoted trap 248 on which balls discharging from pocket 213 are adapted to be received. The pocket 247 also receives balls that pass through the openings E as indicative of "outs" after said balls are acted upon by the batting mechanism, the balls finding their way thereto from tray 259. Extending upwardly and angularly from the left hand end of pocket 247 is a chute 248a, (Figure 8), and entering said chute at 249 is the outlet end of a sinuous chute 251 which functions as a bypass between the "strikes" pocket 213 and said "outs" pocket 247, the upper end of said chute 251 being shown as entering the pocket 213 at 252 and is disposed relative to platform 253 of trap 216 to receive the balls as they discharge upon the platform when the trap is overbalanced by the combined weights of three balls. This feature will be understood on reference to Figure 19 in which it will be noted that the platform 253 inclines downwardly toward the chute 254, the latter clearly shown in Figures 5 and 9. The platform 253 has a vertically extending partition 255 which coacts with the pocket 213 so that when the trap 216 lowers to discharge the accumulated balls, two of said balls will fall to one side of the partition and one to the other side thereof. Said two balls which fall as just stated are conducted to the waste chute 254 for return to the ball reservoir. Said one ball will be conducted to the pocket 247 as indicative of an "out". This operation occurs in succession with each accumulation of three balls in pocket 213 where a temporary record of "strikes" is made.

As stated above, balls entering the openings E are conducted to pocket 247 by means of tray 259. With this in mind, it will be noted that branch 257 of chute 248, (Figure 19) opens to waste chute 254. Chute 231 which receives "foul balls" is disposed under the forward end of tray 259. Located immediately beneath member 232 is the combined lever and chute 254 shown in Figures 5 and 8. This lever consists of a longitudinal channel portion 260 and a ball switching chute section 261, the latter having a ball guiding wall 261a at its left hand end, (Figure 8), the same curved in an opposite direction to the curvature of a similar wall at the right hand end 261b. The wall 261a opens to the duct 263 of tray 259 and the wall 261b to the chute 257. The lever 254 has its trunnion 264 received in a bracket 265 extending from aforementioned bracket 96 of the batting mechanism. Adjustable for longitudinal movement on lever 254, respectively toward and away from the trunnion 264 is a counterbalancing weight 266. It therefore follows that balls leaving the tray 259 as indicative of "outs" are conducted to section 261 of lever 254 by way of the left end 261a thereof and that from said end, said balls discharge into the right hand end 261b and are then discharged to chute 257 from which they make their exit to pocket 247 where they serve as counters for visually disclosing the number of "outs" against the player.

When a ball enters the section 261 of lever 254 the weight thereof overbalances the lever and same is tilted downward and in so doing, the respective detents 203 and 215 operate to uncover the openings 203a and 214 in the respective pockets 189 and 213 so that the balls contained in said pockets will be released to the waste chute through runway 269.

As illustrated in Figure 5, the channel portion 260 of lever 254 is provided with a wall 260a which is of less height than wall 260b as is necessary in that traps of the respective pockets 189 and 213 are disposed directly thereover and in ball discharging relation to channel in said portion 260, from which the balls are returned to the reservoir. As before stated, when three balls are received in pocket 213, two thereof will discharge into the channel of said portion 260 and the other one of said balls will be conducted to pocket 247. Movement thus imparted to lever 254 causes detent 203 to be actuated to thereby clear the balls from pocket 189 if any are contained therein.

When four balls are deposited in pocket 189 which occurs only at a time prior to the accumulation of three balls in pocket 213, the fourth ball to enter said pocket will result in a tilting of trap 204 and said fourth ball will be deflected from the discharge path of the preceding three balls entering said pocket. As will be seen later, the deflected ball just referred to is adapted to be used in coaction with a ball advancing mechanism as indicative of a "base on balls" and for causing other actuations to be set up in said mechanism. Also in connection with the first three balls to enter said pocket 189, means are employed for causing them to be conducted to said waste chute 260. To accomplish this, the platform 272 is provided with a partition 273 so that three balls will be disposed at one side thereof and the fourth ball at the opposite side thereof. It therefore follows that three of said balls will thus discharge to the channel of portion 260 of lever 254 and that said fourth ball will be released to the outlet chute 273a for delivery to the ball advancing mechanism.

The right hand end of lever 254 (Figure 5) has a vertical lug 276, the upper end of which is provided with spaced apart portions 276a. To one side of lug 276 is a ball outlet in said channel portion 260, the same communicating with the aforementioned waste chute. Extending from the free end of portion 260 is a horizontal finger 277.

Beneath the palying surface B in spaced relation thereto is the aforementioned downwardly and forwardly inclined semicircular ball tray 259 having a vertical flange 258 at its front end as shown in Figure 17. The rear portion of the tray is formed with an arcuate vertical flange 258a. The ball outlet 263 is located medially of flange 258 and has downwardly and forwardly inclined walls 263a which extend to said outlet 263. Formed on the tray are respective ribs 279—279; 280—280 and 281—281 which respectively divide the tray into compartments 279a—279a; 280a—280a; 281a—281a and a compartment 282, all of which, except compartments 279a—279a communicate at their forward ends with outlet 263. In the forward ends of compartments 279a—279a which are in registration with respective openings 258b is flange 258 so that "foul" balls passing into said compartments will be discharged from said openings 258b. In the central part of the tray is an opening 282a, the same having a vertical angular wall 282b. This opening is adapted to accommodate the pitching mechanism in a manner to enable the pitcher figure to be disposed above the playing surface B as shown in Figures 4 and 43.

By constructing the tray 259 in the manner above stated, the respective openings 258b are adapted to communicate with chutes 229 and 230 into which balls are conducted when projected into "foul" territory upon surface B. The orifices D at the extreme ends of the arcuate series of outfield orifices aforestated have their lower walls disposed slightly lower than the remaining orifices of said series, except those situated immediately next to the "foul" orifices and are received in the spaces 279a between ribs 279 and flange 258 of said tray. The next adjacent ones of said orifices D which are adapted to receive balls denoting "out on foul fly", are constructed in a manner similar to that just described. The extreme upper edge of the flange 258a closely approaches the under side of the playing surface B and on reference to Figures 2, 4 and 7 it will be noted that said tray rests throughout its arcuate portion upon the base flange A1 of an arcuate channel bar A2 which depends from said playing surface. All balls which pass through the orifices E at those positions presumably occupied by the "pitcher", "center fielder" and "second baseman" are conducted to the compartment 282 and from the latter discharged from duct 263. The respective compartments 280a—280a receive those balls that pass into the orifices at places thereon presumably occupied by the "first baseman" and the "second baseman" and also those which enter the orifices D which denote "out on foul fly".

Because of the aforestated construction of tray 259 and the relationship of the tray to the orifices above described, positively acting means are provided whereby balls indicative of "outs" whether by "fouls" hit into the orifices designated "foul balls" or those that pass through orifices E will be conducted to the respective mechanisms employed for indicating the plays as they are made. The means employed herein enables all balls passing into the "out on foul fly" orifices to be registered as "outs". Others of the balls, namely those batted into others of the orifices D will coact with the ball advancing mechanism in a manner to be described presently.

The playing surface B inclines downward toward the orifices D, and as shown, said orifices are formed in a hollow, longitudinally curved body 283 and are separated from each other by partitions 284. Above the orifices and formed as part of the body is a transversely curved wall 285. Beneath the playing surface B, said body is formed with a flange 286 which supports one end of a tray 287, the opposite end of which is supported by a bracket 288. A flange 289 on said body supports one end of the tray 259, the latter disposed above tray 287. The body has a wall 290 which gradually curves onto the tray 287 so that balls entering the "safe hit" denoting pockets D will be conducted to said tray 287, then conducted to another one of the mechanisms employed as will be described hereinafter.

As shown in Figure 2, the trays 259 and 287 are somewhat similar, the latter being slightly longer than the former as is seen on reference to Figure 4. The tray 287 inclines downwardly and forwardly and is provided with an opening 291 through which the superstructure of the pitching mechanism extends. Formed on the tray 287 are channels 292, 292a, 293, 293a, 294, 294a, 295 and 295a. Said tray is also provided with openings 296, 297, 298 and 299, the last three of which are substantially ovate and are adapted to coact with the ball advancing mechanism into which the balls are conducted and disposed as indicative of "men on bases". The channels 292–295a inclusive follow the inclination of tray 287 and are constructed so that balls may gravitate therefrom to the openings 296–299 inclusive, thence distributed to said ball advancing mechanism.

The intake ends of channels 292 and 292a connect the "one base hit" orifices D with the opening 296 in platform 287. The channels 293 and 293a connect the "two base hit" orifices D with opening 297. The channels 294 and 294a connect the "three base hit" orifices D with opening 298. The channels 295 and 295a connect the "home run" orifices D with opening 299.

The ball advancing and "man on base" simulating mechanism 300 is disposed relative to aforementioned tray 287 to coact with said openings 296–299 inclusive. Said mechanism is located beneath said tray and has frame plates 301 and 302 removably secured in any suitable well known manner to the bottom wall of casing A, the front end of the mechanism being correlated to the front wall of said casing in a manner to enable said mechanism to be readily removed when repairs are to be made to said mechanism. The front ends of said plates extend vertically upward a short distance and are continued into long, upwardly inclined surfaces 301a, the latter continuing into horizontal portions 301b disposed in parallel relation to the bottom wall of the casing A. Positioned between the plates 301 and 302 are relatively stepped and downwardly inclined plates 303, 303a, 303b and 303c, and said plates are fixed between said frame plates 301 and 302 and coacting with each thereof is a stop member 304 against which a ball is adapted to come in contact in its movement down the steps defined by said plates 303a to 303c inclusive.

Extending across from plate 301 to plate 302 and secured at its respective ends thereto is a transverse bar 305 and extending therefrom are downwardly inclined, spaced apart bars 306 which terminate at their lower ends in the positions shown in Figure 13. In front of the lower ends of said bars and formed in the plate 303 are slots 306a, 306b and 306c, each adapted to receive a tiltable finger which will be referred to presently.

Pivotally mounted at 307 between plates 301 and 302 is a counter balanced "hits" denoting trap 308, the same sub-divided by partitions 308a into identical sections 309, 310, 311 and 312. These sections terminate at their forward ends immediately in back of the bar 305. The rear ends thereof are closed by a guard strip 313. Extending from the hinge side of the trap is an arm 314 which carries a weight 315. Upon reference to Figure 13, it will be observed that the upper ends of the bars 306 are disposed in longitudinal alignment with the respective partition strips 308a and that the lower ends thereof are in like alignment with respective tiltable fingers Fa, Fb and Fc. Underlying the fixed plate 303a, (Figures 13 and 19) are tiltable counter balanced plates 316 and 316a and beneath the fixed plate 303b are tiltable counter balanced plate 317 and 317a. Under the fixed plate 303c is a tiltable counter balanced plate 318. The plates 316 and 316a are each of the same length. In Figure 7 is disclosed the normal positions of the parts comprising said ball advancing mechanism, while, in Figure 19, is disclosed the relative positions of the parts when a ball is conducted thereto. The pivoted plates 317 and 317a which underlie the plate 303b are somewhat different from the pivoted plates 316 and 316a. The plate 317 is coextensive with the width of section 309 of trap 308 or one fourth as long as plate 303b. The pivoted plate 318 is coextensive with the trap 308. Each of these plates is provided with an arm 319, the free end of which is provided with a counterbalancing weight 320. From the construction of the parts as described above, it will be appreciated that said pivoted plates tend normally to assume the positions shown in Figure 7. When in said normal positions, the trap 308 occupies the position shown in said Figure 7 and rests against a stop 321. On reference to Figure 19, it will be seen that said pivoted plates over which the balls are free to roll are all limited in their downward tilting movements by the coacting fixed plates which are disposed above them. This action occurs as soon as the ball leaves the fixed plate and proceeds in the direction of stop bar 304 with which it contacts.

Upon reference to Figures 3 and 13 it will be observed that the plates 316 and 317 which coact with the section 309 of trap 308 are free at their forward edges and that plate 317a is provided with a lug 322. Said plates 316 and 317 with said section 309 of said trap constitute the main characterizing features of said "one base hit" division of the mechanism. In the "two base hit" division in which is employed section 310 of the tray 308 in combination with pivoted plates 316 and 317a, there is secured to the forward edge of plate 317a the aforementioned lug 322. Disposed between the frame plate 302 and the adjacent bar 306 and depending from plate 316a is a similar lug 323, and a like lug 324 extends from the edge of plate 318. The next division or "three base hit" section includes the third sub-division 311 of trap 308 in combination with the plates 316a, 317a, and 318, while the aforementioned subdivision 312 of said trap, in combination with plates 316a, 317a and 318 constitute the "four base hit" or home run section of said mechanism.

Reference is now made to Figures 13 and 14, in which latter, the respective fingers Fa, Fb and Fc are employed. These fingers each have a shank 325 secured to a bar 326, the latter carried by a rock shaft 327 journaled in the plates 301 and 302. The fingers Fb and Fc are substantially alike and each has a horizontal arm 328 offset from its shank 325, the free end of which is formed with a depending lug 329. A rod 330 connects the fingers Fa, Fb and Fc together and secured thereto are coacting fingers Fd and Fe, the latter having a branch 331 disposed parallel to the rod 330 and extending angularly downward at 332, thence forwardly to provide a long arm 333, thence upwardly to provide a lug 334, the latter disposed between the lugs 329 of the respective fingers Fb and Fc. The finger Fd is similar to the one just described and is formed at its free end with a lug 335 disposed between fingers Fa and Fb.

The lugs 329 of fingers Fb and Fc and the terminal end 336 of finger Fa coact with a runway 337 at the lower level of the ball advancing mechanism, and as shown in Figure 13, said runway extends at right angles to the respective longitudinal runways which incline downwardly from the trap 308. The runway 337 inclines towards an exit orifice 338 in plate 302. It will also be noted that lugs 329 on fingers Fb and Fc are respectively of different lengths so as to adapt themselves to the gradually increasing depth of the runway 337. In connection with runway 337 and lugs 329 of fingers Fb and Fc and the extension 336 of finger Fa, it is observed that same and lugs 334 and 335 of fingers Fb and Fd are in coacting relationship to each other and that lugs 334 and 335 freely operate in respective slots 339 in the bottom wall of said runway 337.

The bar 326 has an arm 340 which extends rearwardly and horizontally from the shaft 327 and is then continued into an angular lever 341, the latter following the general inclination of the respective tiltable and relatively stepped plates heretofore described as shown in Figure 19, in which figure it is also seen that said lever is correlated to the lugs 323, 322 and 324 so that their lower ends are in normal engagement therewith. In the normal positions of the respective parts shown in Figure 7, it follows that due to the fact that the fingers Fa, Fb, Fc, Fd, and Fe are supported from the shaft 327, they combine to provide a counter weight to hold the upper edge portion of lever 341 against the lower ends of the respective lugs 323, 322 and 324. This normally maintains the fingers in the position shown in Figure 13, at which time, should a ball occupy the transverse runway 337 it will be confined against gravitating to the orifice 338 until the finger which obstructs its movement is raised.

The bottom wall of the runway 337 is hinged at 340 so that it can tilt downwardly and forwardly for a purpose to be described presently. At the hinge side of the bottom wall of said runway, (Figure 7) is an arm 341 which has a weight 342 to hold the free end thereof at rest against a stop flange 343, the latter constituting one of the walls of the aperture K in the score board portion of casing A. It is through this aperture that balls which gravitate to the transverse runway 337 and the actions thereof can be viewed by the player at all stages in the progress of the game. Upon reference to Figure 2, it is seen that aperture K has a depending rear wall 343 and that same is subdivided into as many sections as there are sections of the trap 308 and that said respective sections bear the notations "1st base", "2nd base", etc., as indicative of the base position of a ball on display. As a guide for the bottom wall of runway 337, the left end thereof carries a pin 344 which works in an arcuate slot 345 in the frame plate 301 as shown in Figure 13. Pivotally mounted at 346 on the plate 301 is a counterbalanced lever 347 having a hook 348. This lever, by means of said weight is normally held in the position shown in Figure 13 where it rests freely against a stop pin 349 projecting from said plate.

At a point below the runway 337 is a V-shaped trough 350 which inclines toward an opening 351 in frame plate 302. By means thereof, balls may be finally discharged from the ball advancing mechanism and returned to the aforementioned pitching mechanism for further use.

Upon reference to Figure 3, the relation of the openings 296, 297, 298 and 299 to the sections 309, 310, 311 and 312 of the ball advancing mechanism is such that one will appreciate that balls leaving tray 287 will be deposited in said mechanism to function therein as indicative of the value of the "hit" made and that said balls will gravitate to the lower level of the mechanism for coaction with the fingers Fa, Fb, Fc, Fd and Fe, all in consequence of a ball being successfully batted into one of the "base hit" orifices D, then conducted to a respective section of the trap 308.

If when operating the bat, a ball is projected into one of said "hit" orifices D, it will be conducted to a coacting one of the members 292 or 292a, thence to said coacting section of the trap 308, the weight of the ball causing said trap to tilt relative to bar 305 to enable the ball to pass under said bar as shown in Figure 19 and move across the plate 303a. The ball then gravitates to runway 337 and its movement periodically interrupted by contacting the rods 304. It is in this manner that the weight of the ball is utilized to actuate the aforementioned tiltable plates as it gravitates in the direction just mentioned. When the ball reaches the runway 337 it is held in a definite position by means of the pivoted fingers with which it coacts as aforestated. A more complete description of the functional characteristics of the ball advancing mechanism is as follows:

A ball landing on the trap 308 and arriving at division 309 thereof, rolls across plate 303a and departs therefrom toward gutter 337 and under bar 305. It then rolls onto plate 316, thence onto plate 303b, thence onto plate 317, thence onto plate 303c, thence onto tiltable plate 318, at which time, it gravitates down plate 303 and discharges into gutter 337 where it is stopped by finger Fa. During movement down the respective plates, the ball progressively contacts the retarding bars 304. In this movement of the ball, motion will be transferred to lever 341 through lug 324. The mechanism is thus tripped once, thereby simultaneously tilting fingers Fa, Fb and Fc to positions enabling any ball that may be in the 2nd, 3rd and 4th base sections of the runway to advance one step, the ball that may then be contained in the third base division of the runway to escape through opening 338 as indicative of a run scored. It shall be understood that this movement of the balls occurs as soon as the ball that is responsible for this actuation reaches the tiltable plate 318. This follows in consequence of movement imparted to lever 341 through lug 324 by the weight of the ball. When the ball departs from plate 303, the lever 341 automatically returns to its normal position indicated in Figure 7, and in like manner are the tiltable fingers returned to their ball stopping positions.

In Figure 8, means are shown to receive four balls as indicative of as many "balls" against the batter and for directing one of such balls to the first base section of the ball advancing mechanism. The ball outlet 274 from trap 204 opens to platform 272, whereby the fourth one of said balls will be conducted to chute 275 as will be seen on reference to Figure 13. It will also be noted that said chute inclines toward an opening 352 through which the ball can discharge into the "one base section" of said mechanism. A ball thus discharged into the mechanism will cause the mechanism to automatically function to advance all balls then contained therein a distance presumably the distance of one base.

Assuming that a ball has been batted into one of the "two base hit" orifices D and is received in subdivision 310 of trap 308, same will move down the stepped plates 316, 317a and 318, setting same in action and causing lugs 322 and 324 to successively trip the aforementioned lever 341.

The first tripping impulse imparted to said lever causes all balls contained in the mechanism, that is to say, in runway 337 to advance a distance presumably equivalent to one base, at which time, the fingers Fa, Fb and Fc are lifted once.

Actuation similar to that above described is set up in lever 341 when a ball discharges into the mechanism from either of the subdivisions 311 and 312 of trap 308. Generally speaking, when a ball enters subdivision 309, it results in said lever being actuated once; twice when it enters the mechanism from subdivision 310; three times when it enters the mechanism from subdivision 311. With this in mind and as a further illustration of the possible operations, it can be assumed that a ball is contained in the mechanism at one side of finger Fa, and that a ball indicative of a "two base hit" is being delivered to the mechanism. The two resulting impulses imparted to lever 341 in consequence thereof cause a rocking motion to be imparted to the entire group of fingers in runway 337, the finger Fd moving upwardly through slot 339. The ball which previously resided at one side of finger Fa is liberated and advances toward finger Fd and further movement of the ball prevented until the finger is again retracted. It is important to note that slots 339—339 are disposed with respect to fingers Fa, Fb and Fe so that a ball can be accommodated at either side of either one of said slots. That is to say, the space between any two of the fingers is proportioned to accommodate two balls at the same time. The object of stopping a previously liberated ball is to prevent the ball from rolling too rapidly before said fingers Fa, Fb and Fc have been again elevated and before fingers Fd and Fe have been retracted.

The next tripping of said mechanism causes the ball to be liberated from finger Fb, allowing same to roll down the gutter 337 until stopped by the next underlying finger Fe. The means employed herein enables all balls contained in the gutter to move for controlled distances according to the value of the hit made.

When a ball proceeds down plates 316a, 317a and 318 from subdivision 311 of trap 308, the finger mechanism in gutter 337 is successively actuated three times. Should a ball be contained in the "one base hit" section of the gutter, it is progressively advanced in the gutter and is discharged through opening 338. The ball responsible for this actuation takes a position at the "third base" section of the mechanism. Assuming that instead of a ball occupying a "one base hit" section in the mechanism and that the next batted ball enters the "two base hit" section, the first said ball will only be advanced to the "three base hit" section. This is due to the fact that the finger mechanism functions but twice.

The ball on leaving opening 338 at the lower end of gutter 337 is discharged into an inclined chute 353, (Figures 9, 11 and 15) supported at 354 by a pin 354', the latter also serving to pivotally support a lever 355. The short section of the lever is provided with a weight 356, the long section having upstruck therefrom a gate 357, the angular branch 357a which serves as a closure for a ball discharge slot 358 in the bottom of said chute. Said lever has an angular branch 359 extending into the chute and same is provided with an opening 360 for the passage of balls therethrough. Upon reference to Figure 9, three balls are shown in chute 352, the first one of which is disposed half way in the opening 360. Said ball rests upon the angular branch 357a of said gate 357. At the juncture of the branch 357a with portion 357b of the gate and at one side of opening 360 is a ball rest 357. This rest is tapered on its upper face to merge onto the upper face of the bottom wall of chute 353 and thereby allow free movement of the ball thereover. A ball occupying the position above referred to will overbalance the counterweight 356 so as to tilt the lever 355 and uncover the slot 358 and thereby allow the ball to be transferred to chute 361. In order that balls that are in the chute when the gate is being lowered will not interfere with the method of handling the balls singly, the lever is formed with a stop surface 362 in the path of movement of the lever as shown in Figure 11. With the successive release of the balls, the weight 356 acts to immediately return the lever to its normal position ready to receive and be acted upon by the next ball.

Extending vertically from the gate 357 is an arm 363 the upper end of which is disposed slightly above an adjacent portion of the chute 364 for the "out" balls. This arm functions to transfer motion to a lever 365 and same has its upper end bent to provide an angular branch 363a which rests freely upon an adjacent upper surface of said lever 365.

Upon reference to Figures 2 and 19, it is noted that a chute 366 is disposed at the rear of pocket 247, the chute having an opening 366a in communication with said pocket. It will be borne in mind that pocket 247 contains trap 248 onto which balls indicative of "outs" will be received as they are conveyed from the playing surface. Said chute serves to convey balls from the trap 248 as they are discharged therefrom and return same to the ball reservoir with which said chute communicates.

Upon again referring to Figure 9, it will be seen that at a point in advance of chute 353 is a tiltable trap 367, the same provided with a counterbalancing weight 368, by means of which, the trap is disposed in the path of movement of balls passing down the chute 364. Overlying chute 364 is a counterbalanced lever 369 having a pair of spaced apart gates 370 and 371 of graduated lengths. These gates extend downwardly into the chute 364, as shown. When three balls have entered pocket 247 denoting "three out", the playing interval of the game will have ended. Said balls are then discharged from the pocket and into chute 364 where their movement will be stopped by gate 370 and held there until a new game is started. In this manner, an indication of the score last made will be preserved so that the next player may be informed thereof. It is to be understood that these balls are instantly expelled from the chute 364 on the deposit of the next coin in the machine and that the record of the score made by a previous player will be automatically cancelled just before the first ball is pitched for the next succeeding game. When motion is imparted to the rocker 367, the gate 370 is retracted from the path of the stopped balls to thus free said balls for movement until again stopped by the next gate 371. At this last mentioned moment, the balls are disposed directly over the pivoted trap 367 and the combined weights of said balls will thus overbalance the weight 368 and cause the balls to discharge into chute 361 as will be understood on reference to Figure 10. However, before said balls will be finally discharged into said chute, it should be understood that a load sustaining lug 372 on trap 367 must first be acted upon and released. The means employed herein for releasing said lug will be described hereinafter.

From the opening 351, the chute 361 inclines downwardly and rearwardly as shown in Figures 9 and 10, thence inwardly at 373 where it communicates at 374 with the discharge end of the branch 233 of the aforementioned chute 231, the latter serving to conduct the balls from the "foul" ball orifices D. The chute 361 continues at 375 to the left as shown in Figure 3, whereby said balls can be returned to the ball feeding mechanism to be described later.

Upon reference to Figures 2, 3, 9, 10, 12, 13 and 16, it will be noted that a rod 376 passes through an arcuate slot 377 in frame plate 302 and is secured to trap 308 of the "hit" denoting mechanism. To one side of said plate, the rod extends over the finger 277 of the tiltable waste ball chute 254 with which it freely engages. The rod is offset at 376 to dispose its free extremity in free resting engagement with an oscillatory lever 379, from which lever, motion is transferred to the mechanism for recording "hits." It follows that when a ball drops upon the trap 308, said trap will be tilted, carrying with it the rod 376, and as a result thereof, the finger 277 is depressed. This tilts the chute 254 and causes detents 203 and 205 to be actuated and thereby cause balls to be discharged from the "strike" and "ball" traps 213 and 189 respectively.

The tilting of the bottom wall of runway 337 is effected by actuation of the tiltable lever 347 which functions through hook 348 to engage pin 344 in the arcuate slot 345 in frame plate 301. On reference to Figure 21 it will be appreciated that the under side of the trap in pocket 247 for denoting "outs" is provided with an actuating member 380 which is responsive to the weight of three balls, so that as the balls discharge from the trap the member will press upon the tapered extremity 347a of lever 347 and cause the hook 348 to be instantly disengaged from pin 344. Any balls that may be in the gutter 337 are now dumped into trough 350 for discharge through opening 351 and return thereof to the ball reservoir. In order that lever 347 can be held from shifting laterally and from an unobstructing path of actuating member 380, the upper end thereof is received in a vertical slot 347b in a fixed guide bracket 347c.

At 381a on lever 347 is a roller of insulating material, and as shown in Figure 20, it is disposed between resilient members 382 and 383 of conducting material, the roller being in normal engagement with member 383. Adjacent to their free ends, said members are respectively provided with contact points 384 and 385. At their lower ends, said members are secured to a block 386a of insulating material, and connected with said members are conductors 386 and 387 respectively which are arranged in a control circuit to be described presently. When lever 347 is depressed as aforestated, the roller 381a is advanced against member 383 and contact point 385 thereof disengaged from contact point 384, whereby the circuit which includes motor 406 will be broken, thus stopping operation of the machine, except as otherwise provided for herein.

Disposed at one side of the mechanism for denoting "hits", (Figures 2, 9, 10, 11 and 12)

are rotary dials 387a, 388 and 389, the first two of which are in side by side relation to each other at a point substantially beneath the dial 389. Arranged about the dial 389 are names, presumably those of ball players. It is proposed that said dial be actuated automatically, whereby in timely order the names will be successively exposed to view. Each of the dials 387a and 388 has its peripheral surface provided with a circular series of numbers 390. Said dial 387a is used for registering the number of "runs" scored in the course of a predetermined playing period. The dial 388 is used to register the number of "hits". The dials 387a, 388 and 389 are respectively disposed in back of the windows L, M and N in the score board A1 of aforementioned casing A.

The dials 387a and 388 are loosely mounted on a shaft 391 mounted in a bracket 392. The dial 389 is free to revolve on a shaft 393 which is supported by said bracket. On the dial 388 is a lug 394 adapted to coact with a stop pin 395 on said bracket. These dials may be of any suitable well known construction adapted to be moved intermittently.

The ratchet mechanism of the dial 389 is actuated by a lever 395a, one end of which is disposed between lugs 276a upon chute 254 so that when the chute is tilted, either as a result of the action of a ball indicative of an "out" or by a ball indicative of a "hit", the dial 389 will be turned to display presumably the name of the next player.

The detent mechanism (not shown) of the "runs" denoting dial is actuated by a rock arm 365 which can turn about the axis of shaft 391, and as shown in Figure 11, said arm is operatively connected with a power transferring arm 363 on the lever 355, and as will be recalled, the latter is adapted to be actuated by the tiltable branch 357a of lever 355. It is in this manner that operations of the respective mechanisms are synchronized to thus insure recordation of "runs" as they are made.

It will be noted that shaft 391 has incorporated therewith spring means 397', (Figure 2) which operates to turn the adjacent recording dial in a resetting direction. Normally, the dials are held from turning under the influence of said spring means 397' by said detent mechanisms. A releasing lever 398 when depressed causes the pawls of said mechanisms to be released from their coacting ratchet wheels and the dials thereby returned to their starting positions. It should be borne in mind, however, that the functional action of the parts just described may be said to be more or less the normal operation which follows in the event that the player makes less than a predetermined number of "runs". I have provided means whereby should the operator make eight or more runs before "three outs" are registered against the operator, the mechanism will automatically reset itself so that the operation of the machine will continue for a further period of time. The mechanism employed to accomplish the purpose just referred to is as follows:

Mounted on shaft 391 is a cam 392 having a surface 393 which extends from a shoulder 394 of the cam to a portion 395 in the periphery of said cam, the distance from shoulder 394 to portion 395 being equivalent to a partial rotation of the "runs" dial 387. The dial may rotate starting from zero and continue until the numeral 8 thereon appears at the window in front of said dial, and during this partial rotation, the cam will not affect any part of the resetting mechanism. From point 395 in the cam to point 396, as shown in Figure 22, the radius of the cam surface is greater than to the left or from shoulder 393 to aforestated point 395. From point 395 to point 396 can represent the distance of rotation from numeral 8 to the highest number on the dial, which, in the illustration is 15. At 397 is a stationary block of insulating material which has spaced apart flat leaf springs 398 and 399, the latter provided with a contact point 400 and the former provided with a similar contact point 401. It will be noted that that spring 399 is slightly longer than spring 398 and that it bears against the periphery of cam 392. These springs are connected with respective conductors 402 and 403 of the motor control circuit shown in Figure 38. It follows that when dial 387 is rotated to cause the spring 339a to approach beyond point 395 and toward point 396, the contact point 400 will come in engagement with contact point 401. In so doing, current will flow through conductors 402 and 403 and across conductors 286 and 287, whereby when "three outs" occur and contacts 384 and 385 are separated from each other, the motor will be supplied with current to thus continue the motor in operation. This is due to the fact that at the time just mentioned, the circuit is completed through said contacts 400 and 401.

Upon reference now to Figures 34 and 37 inclusive and Figure 38 it will be seen that means are employed for periodically altering the line or path of movement of a pitched ball, thus rendering it difficult for the operator to determine the course over which the ball will travel. In Figure 34 a ball has been delivered to the pitcher figure ready to be thrown through space for a slight distance and then roll over the playing surface B toward the bat 100. In front of the pitcher figure and upon the playing surface is a circular mat of suitable material 404 such as rubber. The mat occupies a position along a line drawn medially through the simulated baseball diamond from the home plate to the second base position, said line passing directly across one of the "out" orifices D in back of said mat. Said orifice is correlated with an arcuate deflecting stop flange 405 which serves to stop a pitched ball, the line of movement of which is coincident with said medial line, thereby causing the ball to be deflected into said orifice. In Figure 34 the pitcher figure is shown in a ball receiving position in full lines and in ball pitching position in dotted lines. Inasmuch as the figure tilts through an arc of a circle when operating as just stated, the ball will leave the figure as soon as the figure is in the dotted line position and will move through space over a parabolical path and drop to the mat 404 from which it will roll along a path which may either be along said medial line or along a lane at one side or the other thereof depending upon the angle of deflection when leaving the pitcher figure.

In Figure 35 it will be assumed that the batting mechanism has been manually actuated to dispose the bat in the full line position at right angles to the aforestated medial line. The pitcher figure is in a neutral position. If the ball is now thrown it will proceed along said medial line and strike the flat face of the bat at Ma. The ball will be returned in the direction from whence it was thrown and will travel along said medial line, and will be stopped by flange 405 in front of the pitcher figure and discharged into the "out" orifice E. Because of the possible positions into which the pitching mechanism can move as shown in Figure 32, the pitched ball may proceed along one or the other of the lines M1 or M2 and impact the bat at some point between the ends of the flat face thereof. In such event, the ball will be projected in the direction of the "hit" denoting pockets in the outfield portion of the playing surface B. If the ball follows line M3 it will be counted a "two base hit" to the right field. If it follows line M4 it is counted a "two base hit" to the left field.

In Figure 36 it will be seen that the bat is in a position other than a right angle to the aforestated medial line and the ball may be possibly discharged into an orifice E and be counted an "out to left field", or it may escape said orifice and be received in a "three base hit" orifice in said outfield portion of the playing surface. In Figure 37 from the position of the bat therein shown, the ball will be projected along one line or another in the direction of the right field portion of the playing surface and plays similar to those just set forth may result.

In the normally open circuit shown in Figure 38 is connected a motor 406 for driving the various automatic mechanisms employed herein. Also connected in said circuit is a coin actuated switch 407; a switch closing solenoid 408; a resistance coil 409 and a two pole armature 410. The circuit closers shown in Figures 20 and 22 are also connected in said circuit and same operate in the manner which shall now be described.

When a coin is deposited in slot S it will actuate switch 407 to thus close the circuit. The current flow will be through wire 411; through wire 387 from contact spring 382 in the circuit closer of the "out" trap shown in Figure 20; through wire 386; through coil 409 and back to lead wire 412. This shunt circuit through solenoid 408 closes the circuit through armature 410 and throws contacts 413 and 414 in operation. The current now flows along a direct path between positive terminal 415 and negative terminal 416, passing across contacts 413 and 414 and a continuous circuit maintained through solenoid 408.

When "three outs" are denoted, the circuit will be controlled through contact elements 382 and 383, whereby roller 381 will advance against element 383 to urge same away from element 382 to open the circuit and stop the motor. But it will be borne in mind that means are provided herein for continuing the motor in operation notwithstanding the fact that "three outs" have been denoted, such for instance, in the event that the player shall have succeeded in securing eight runs or more before said "three outs" have been registered against him. The wires 402 and 403 are in parallel and when cam 392 functions to close contacts 398 and 399 the current passes solenoid 408 and coacting elements 400 and 401 and said elements are thereby made to replace elements 382 and 383. The machine is now made to continue operating until a condition of "three out" occurs. This operation may repeat itself as often as the player shall make eight runs before a condition of "three out" occurs.

Reference has been made to means for imparting motion to the player figures used in combination with the orifices D and openings E. It is not proposed, however, that motion be imparted to the figure occupying the position of a center fielder. The figures now to be described are the three thereof at the right of the pitcher figure and the three to the left thereof. On reference Figures 1, 39, 41 and 42 it will be seen that beneath the surface B at the respective sides of the pitcher figure are flat, triangular plates 417—417, each having connected thereto three of the aforestated curved stop members F. These members are connected to their respective plates by rivet means 418. Each of said members supports its player figure so that said figure faces the batting mechanism and is disposed rearwardly of a correlated opening E. Formed in the surface B rearwardly of the openings E are arcuate slots 419 in which the rivets 418 are received. Formed in each of the plates 417 is an ovate slot 420 which is aligned with the opening E thereabove. The rear portions of said plates are provided with channel members 421 in which anti-friction rollers 422 are free to move. The front portions of the plates have similar channels 423 in which are disposed the rollers 424. A power transferring rod 425 extends from each of said plates in a direction toward the axial line of the playing surface as shown in Figure 39. The free ends of said rods have depending pins 427 which extend into respective cam grooves 428 in the periphery of a rotary drum 429. These grooves are disposed at the respective sides of a line drawn medially through the drum and each groove is characterized by four short length portions 430 and four each of the portions 431 and 432 of V-formation, the portions 431 extending inwardly toward the medial line of the drum and the portions 432 toward the outer faces thereof. In view thereof, the player figures can shift either to the right or to the left of said openings E, and as portions 430 of the grooves are circumferential of the drum, the mechanism provides for the figures assuming neutral positions relative to said openings. It will be noted that certain of the outwardly extending portions 432 in one groove are directly opposite the corresponding portions of said other groove and that certain outwardly extending portions of one groove are opposite the inwardly extending portions of said other groove, and that some of the inwardly extending portions of said one groove are oppositely related to the outwardly extending portions of said other groove. By reason thereof the player figures at one side of the pitcher figure will move in the same direction as the figures at the other side of the pitcher figure during one part of the cycle of rotation of the drum. In another part of the cycle one set of said figures will move in an opposite direction to those which comprise the other set. It is also possible for one of said sets of figures to move inwardly relative to said medial line as the other set of said figures is moving in a direction away from said line. In other words, the movements of two sets of figures are so controlled that they will be simultaneously moved to the right, then to the left; then away from each other to their extreme positions; then toward each other. By reason of the coacting circumferentially curved portions 430, the respective movements of the two sets of figures occur progressively after each return of the figures to normal or neutral positions.

A fixed bracket 433 supports the drum 429, and secured to the shaft 434 of said drum is a ratchet wheel 435. Movable about the axis of said shaft is an oscillatory lever 436, the upper end of which has a pawl 437, and at 438 on said bracket 433 is a latching pawl, the latter and said pawl 437 coacting with said ratchet wheel. Extending between the bracket and said lever 436 is a spring 439 which normally coacts with the lever to hold pawl 437 engaged with the teeth of said ratchet wheel and maintain a position of the lever where the lower end thereof rests against a stop 439a. Extending from one side of wheel 93 is a trip pin 440 which engages a pin 445 at the lower end of the lever 436, whereby movement is imparted thereto as the wheel revolves. This actuation of the lever is synchronized with operations of the pitching mechanism so that the respective sets of player figures will move and possibly intercept movement of a pitched ball. By reason of the arrangement of the grooves in said cam drum, the actuation of the lever 436 first causes the respective groups of player figures to move relative to each other and immediately thereafter, a second pin 441 on wheel 93 comes in contact with the lever 436, and through the ratchet means with which it coacts the player figures will be returned to their normal positions at the adjacent circumferential portions 430 of said cam grooves. These respective pins 440 and 441 successively function in like manner as the wheel 93 continues to rotate. In order that the pins 427 will be held under yielding tension and freely respond to actuation of grooved drum 429, springs 446 are connected between said plates 417 and said playing surface B as shown in Figure 39.

The motor 406 is mounted as shown in Figures 3 and 4 and has its shaft 447 operatively connected in a speed reducing system 448 of any suitable well known construction, and from shaft 448a in said system, power is imparted to the main cam wheel 93. From wheel 93 power is supplied the various instrumentalities of the mechanism.

Assuming that a coin has been deposited in the machine and that motor 93 is operating and that a ball is ascending the elevator, said ball will be deposited in the cup of the pitcher figure as shown in Figure 43. It will be borne in mind that a coin deposited as just stated, releases the batting mechanism and that the bat is now under the direct control of the operator. It is intended that the operator shall closely observe the progressive motions made by the pitcher figure prior to delivery of the ball. He can purposely hesitate to hit the ball, figuring that because of the angle at which the ball is delivered it will pass to one side or the other of the "home plate" and be counted a "ball." He may have miscalculated, and the ball, may cross over the plate, and be counted a "strike." Should the ball pass to said one side or the other of the "home plate" and thus be counted a "ball", the ball will pass to the ball trap and cause the left arm of the "umpire figure" to be raised as indicative of a "ball." The ball is then discharged into the pocket at the display opening H and remains there until four balls are received therein, thus serving to indicate the actual number of "balls" charged against the operator. If the operator hits the ball under the conditions illustrated in Figure 37, the ball goes in the "foul" orifice D in the right field section of the playing surface and proceeds to the pocket behind the window I and is counted a "strike." Prior to this time, the ball causes motion to be set up in the "strike" denoting trap and the right arm of the "umpire figure" will be raised. Balls may successively congregate in the pocket behind the window I until three balls are received therein. Balls entering the pocket as just stated serve to indicate the actual number of "strikes" on the player. Balls that are not hit and which directly pass over the "home plate" are delivered to said opening I and the right hand of the "umpire figure" is likewise raised as indicative of a "strike."

Consider a condition where "two balls" and "two strikes" are counted against the operator and the next ball pitched results in a condition indicated in Figure 36, the ball having been hit into an "out" opening E in the left field section of the playing surface. This ball is conducted to pocket behind opening J as indicative of an "out." Said ball causes the tiltable chute 254 to be actuated and the detents 203 and 215 thereby operated to release balls from said pockets behind openings H and I. When released, said balls will return to the reservoir for subsequent use. As the chute tilts, arm 277 functions to actuate the dial 389 and the name of the next player is thereby disclosed. At this stage of the game, the score stands 0 hits; 0 runs and one out.

Assume next that because of two succeeding batting operations, "two strikes" are registered against the operator and the latter hits the next ball into the territory illustrated in Figure 37 and is "out." The ball is conducted to the pocket in back of opening J and the balls indicative of "two strikes" cleared from pocket I and returned to the ball reservoir.

Assume that on the next succeeding operation, a ball is hit into the territory illustrated in Figure 35 as indicative of a "two base hit." The ball is deposited upon tray 287, then conducted to opening 297 from which it proceeds down the stepped sections leading to the "two base hit" division of the "hit" and ball advancing mechanism as will be understood on reference to Figures 3 and 13. Said ball will occupy a position between fingers Fa and Fb. As it moves to the position last stated, the trap 308 is actuated by said ball and the chute 254 tilted to effect release of balls then contained in the respective pockets behind the "balls" and "strikes" openings H and I. Simultaneously with this operation, dial 388 will be actuated through lever 379 to register "one hit." At the same time, dial 389 will be turned to disclose the name of the next assumed batter. It will be borne in mind that chute 254 functions as (1) means to cause the balls to be cleared from the "balls" and "strikes" pockets; (2) means to affect registration of "hits", and (3) means for disclosing the name of the next batter. I have previously described the action that occurs when balls are present in others of the base denoting divisions of the "hits" denoting and ball advancing mechanism, and shall make no further reference thereto.

The aforementioned gates 370 and 371 employed in connection with the means for disclosing to the next player the number of runs scored by a previous player are controlled in the following manner: Mounted in a bracket 450 is a rock shaft 451 to which one end of lever 369 is secured. Said shaft has a substantially L-shaped portion 452 coacting with cam wheel 93 as shown in Figure 45, the same having a trip portion 453 located at one side of said wheel and disposed in the path of movement of pins 172 and 173. These pins function to successively engage trip portion 453 so that upon starting a new game, pin 172 will first coact with said portion as the wheel 93 revolves, thus raising the gate 370 to allow the balls in chute 364 to pass onto trap 367. As the wheel continues in motion, pin 173 engages said trip portion 453, thereby again actuating the shaft 451 with a resulting raising of gate 369 in order that the balls upon trap 367 will discharge therefrom as will be understood on reference to Figure 10. In this movement of the trap, the balls are returned to the ball feeding mechanism, and as the trap lowers, the lug 372 presses upon the lever 398 to set same in motion and actuate the escapement mechanisms in order that the dials will return to starting positions prior to the pitching of a ball at the start of a new game.

Except for the batting mechanism herein employed, all of the several mechanisms above described are automatically controlled. I have provided means whereby the balls used herein are a necessary part of the organization. This is with an exception of those balls that are compelled to vacate the score board after functioning to denote "home runs", and as to them, it follows that by providing the recording dial 387, a record of "runs" produced thereby is instantly made as the balls discharge from the score board. Balls indicative of "balls", "strikes" and "outs" remain at the score board until "three outs" are registered and simultaneously with the stopping of the motor 406, all of these balls are instantly cleared from said score board and conducted to the ball feeding mechanism for further use. In view of the fact that the balls are all compelled to pass to the score board in succession with the making of certain plays, the foregoing arrangement and combinations of parts render it unnecessary to employ independent recording mechanisms. I consider it an important part of the invention that the balls function as herein set forth in combination with a score board at which certain balls are constantly visible throughout that period of time indicative of "three out", and that others of the balls, namely, those indicative of "home runs" are made to become visible at the score board as such plays are made.

While the machine is especially designed for playing a simulated game of baseball, it shall be clearly understood that such use is not to be construed as limiting. Various modifications in the arrangements, forms and constructions of the parts employed can be made without departing from the spirit of the invention.

A feature of novelty which I wish particularly to stress is the use of means for striking a ball after it has been delivered onto the playing surface, whereby to cause the ball to be reprojected either in a direction from whence it was delivered to the surface or in some other direction on said surface, and the striking means automatically reset after each striking operation.

I further lay particular emphasis upon the use of a play-surface having one or more openings of low scoring value and one or more openings of higher scoring value, in any one of which a ball can be received, in combination with ball projecting devices by means of one thereof balls can be projected onto said playing surface toward said opening or openings of low scoring value and the ball made to be acted upon by the second said projecting device and projected in the direction of said opening or openings of higher scoring value for reception therein and the received ball then physically employed to indicate the value of the play made.

I claim as my invention:

1. Baseball game apparatus having a surface simulating a baseball field, in which a part thereof represents "foul ball" territory; batting means; means for projecting balls to said batting means; means for registering "Strikes"; and means operable after "two strikes" are registered for preventing registration as "strikes" of any and all balls thereafter batted into said "foul ball" territory.

2. The combination with a baseball game device; of means for registering "foul balls" as "strikes" until "two strikes" are registered and then preventing subsequent "foul balls" from being registered as "strikes"; and means for denoting an "out" on "three strikes".

3. Baseball game apparatus including playing balls; a casing having a playing surface over which the balls can roll and provided with a score board formed to receive the balls; the playing surface having orifices through any one of which a ball can pass; conduits for conducting balls from the orifices to the score board; means for classifying the balls at the score board as indicative of "balls", "strikes", "outs" and "hits"; means for automatically effecting periodical advancement of the "hit" denoting balls at said score board in simulation of players running the bases of a baseball diamond; means for clearing all balls from the score board at a predetermined playing interval; and means for preserving at the score board a record of a score made by the next preceding player.

4. In a ball batting organization; a vertical shaft having a horizontally disposed bat; spring means for turning the shaft in a batting direction; a motor having driving connection with the shaft to turn same in a resetting direction; means for latching the shaft when the bat is reset; and manually actuable means for releasing the latching means to enable the shaft to turn in said batting direction under the influence of said spring means.

5. The combination with a bat mounted to swing across the path of a pitched ball, and manually actuable means for determining the moment at which the bat shall swing in a batting direction; of motor operated means for automatically pitching balls at regular intervals along said path and for resetting the bat after each batting operation thereof.

6. The combination with a bat mounted to swing across the path of a pitched ball, and manually actuable means for determining the moment at which the bat shall swing in a batting direction; of motor operated means for automatically pitching balls at predetermined intervals along said path and for resetting the bat before each operation of the ball pitching means.

7. The combination with apparatus having means for pitching balls at predetermined intervals; of ball batting means related to the pitching means to bat said balls; a motor for operating the pitching means; manually actuable means to render the batting means effective at any time during movement of a ball from the pitching means; and means controlled by the motor for resetting the batting means after each batting operation thereof.

8. Apparatus of the class described having motor actuated ball pitching mechanism; spring actuated normally set ball batting mechanism; manually controlled means for placing the batting mechanism in operation to bat a pitched ball; and means for automatically returning the batting mechanism to a batting position following each pitching operation of the pitching mechanism.

9. In game apparatus; means for automatically pitching a ball; batting means co-acting therewith; means for moving the batting means to bat a ball; and manually actuable means to render the moving means effective for an operation of the batting means and for placing the batting means beyond further manual control until the next operation of the pitching means to pitch a ball.

10. Baseball game apparatus having a playing surface provided with orifices indicative of "strikes" and "balls"; balls adapted to pass through the orifices; an umpire figure having movable right and left arms respectively; ball actuated means coacting with the "strikes" orifice to raise the right arm of the figure; and ball actuated means coacting with the "balls" orifice to raise the left arm of the figure; ball pitching means; ball feeding means having an opening passing through the umpire figure; and means for tilting the pitching means to receive a ball from the opening and for then moving the pitching figure to pitch a ball therefrom.

11. In an organized group of mechanisms for playing a simulated game of baseball; a movably mounted pitcher figure having means to freely support a ball; means to impart motion to the figure to cause the ball to leave the support; and means for periodically acting upon the figure to change the course of movement of the ball pitched therefrom.

12. Game apparatus including tiltable ball pitching means; reciprocal means for conducting balls to the pitching means; rotary means for feeding balls to the reciprocal means; and means operable through the rotary means for tilting the pitching means.

13. In baseball game apparatus, the combination with batting means movable about a vertical axis; of ball pitching mechanism correlated therewith and having a support movable about a vertical axis and a ball ejector movable about a horizontal axis; means to actuate the ejector; a cam of irregular outline coacting with the support for imparting irregular motion thereto; means for presenting the support to the cam; and means for imparting intermittent motion to the cam.

14. In a baseball game device, the combination with motor driven means to pitch a ball at regular intervals along relatively different predetermined paths; of means to render the pitching means operative to pitch the ball as aforestated.

15. In a baseball game device, the combination with motor driven means to pitch a ball at regular intervals along relatively different predetermined paths, and means to render the pitching means active for the purpose stated; of means for automatically stopping operation of the pitching means.

16. The combination in game apparatus, of automatically operating means for pitching a ball; reciprocal means for conducting a ball thereto; and rotary means for feeding balls to the conducting means.

17. Game apparatus including, in combination with automatic means for pitching balls at regular intervals along relatively different predetermined paths toward a batting means; of means for returning a pitched ball to the pitching means.

18. In game apparatus, a ball pitcher figure; an umpire figure disposed in back of the pitcher figure and having movable arms; motor driven means to transfer a ball from the umpire figure to the pitcher figure and for operating the latter; and means connected with the respective arms of the umpire figure to move one or the other thereof and including mechanism over which a pitched ball is adapted to move and to be depressed by the weight thereof.

19. In a game device, playing balls; a motor; means driven by the motor for successively pitching the balls; batting means coacting with the pitching means; means for classifying the pitched balls; and means for stopping the motor and for returning the pitched balls to positions for successive delivery thereof to the pitching means when operation of the motor is resumed.

20. Baseball game apparatus including movably mounted player figures; ball pitching mechanism; means for successively conducting balls to the pitching mechanism; motor driven means for operating the pitching mechanism and the conducting means and for imparting motion to the player figures; and batting means coacting with the pitching mechanism for batting a ball toward said player figures.

21. The combination with baseball game apparatus including means for pitching a ball; means for batting a ball; and means for indicating "strikes"; of means actuable following movement of the batting means to bat a pitched ball for causing operation of the "strike" indicating means whenever the line of movement of a pitched ball is outside the effective ball batting range of the batting means.

22. The combination with apparatus for playing the game of baseball including a casing having a playing surface and operatively correlated ball pitching and batting mechanisms provided with respective ball pitching and batting portions disposed above the playing surface; a motor for operating the pitching portion to cause a ball to be pitched to the batting portion at regular intervals; motor actuated means for returning the pitching and batting mechanisms to starting positions after pitching and batting operations have been imparted thereto.

23. The combination with apparatus for playing the game of baseball including a casing having a playing surface and operatively correlated ball pitching and ball batting mechanisms respectively; a motor for operating the pitching mechanism to pitch a ball to the batting mechanism at regular intervals; means for starting the motor; means for stopping the motor; motor actuated means for returning the pitching and batting mechanisms to starting positions after pitching and batting operations have been imparted thereto.

24. The combination with an apparatus for playing the game of baseball including a casing having a playing surface and operatively correlated ball pitching and batting mechanisms provided with respective ball pitching and batting portions disposed above the playing surface; of a motor common to said mechanisms for operating the pitching mechanism to cause a ball to be pitched from the pitching portion thereof to the batting portion of the batting mechanism at regular intervals; means for starting the motor; ball actuated means for stopping the motor; means for causing the operation of the batting portion to become effective at a time wholly discretionary with the operator by an actuation manually controlled from outside the casing; and means actuable by the motor for resetting said batting portion after each operation thereof to bat a pitched ball.

25. The combination of an organized baseball game apparatus having pitching mechanism; an electrically driven motor therefor; an electric circuit in which the motor is operatively connected; circuit controlling devices in said circuit; automatic means for breaking the circuit through one of the devices to stop operation of the motor; and means for immediately closing the circuit through the other device to again start the motor.

26. The combination of an organized game apparatus, including pitching mechanism; an electrically controlled motor; an electric circuit in which the motor is connected to function; circuit controlling devices in said circuit; automatic means for breaking the circuit through one of the devices to stop operation of the motor; and means for immediately closing the circuit through the other device to again start the motor in operation.

27. Game apparatus including ball batting means; ball pitching means; a motor having driving connection with the pitching means; ball actuated means for stopping the motor; and ball actuated means for restarting the motor.

28. In baseball game apparatus; a plurality of balls; batting mechanism; means for successively displaying the balls after they have been batted; means for automatically changing the relative positions of some of the displayed balls as indicative of players running the bases of a baseball diamond; means for operating the batting mechanism to bat a ball; means for manually rendering the operating means active to bat the ball as aforementioned; means for pitching the balls to the batting mechanism; and a motor cooperable with the batting mechanism and the pitching means to actuate the latter at timed intervals and for returning the batting mechanism to a starting position after each pitching operation of the pitching means.

29. In apparatus for playing the game of baseball; a plurality of playing balls; manually controlled means for batting said balls; means for pitching the balls to the batting means; scoring means cooperable with the balls to receive and display same in succession with operations of the pitching means; means for discharging one or more balls from the scoring means following some operations of the pitching means; means for discharging all balls from the scoring means when same shows a predetermined registration; and means for causing successive delivery of the discharged balls to the pitching means and for operating the latter until all balls are discharged from said scoring means and then stopping operation of the pitching means and locking same and the batting means from operating.

30. In apparatus for playing the game of baseball; a plurality of playing balls; manually controlled means for batting said balls; means for pitching the balls to the batting means; scoring means cooperable with the balls to receive and display same following each operation of the pitching means; means for discharging one or more balls from the scoring means following some operations of the pitching means; means for discharging all balls from the scoring means when same shows a predetermined registration; and means for causing successive delivery of the discharged balls to the pitching means and for operating the latter until all balls are discharged from the scoring means; and means for locking the pitching means against operation.

31. In apparatus for playing the game of baseball; a plurality of playing balls; manually controlled means for batting said balls; means beyond manual control for pitching the balls to the batting means; scoring means cooperable with the balls to receive and display same following each operation of the pitching means; means for discharging one or more balls from the scoring means following some operations of the pitching means; means for shifting the positions of some balls in the scoring means; means for discharging all balls from the scoring means when same indicates a predetermined registration; and means for causing successive delivery of the discharged balls to the pitching means and for operating the latter until all balls are discharged from said scoring means.

32. Game apparatus comprising means having a playing surface; balls adapted to move over the surface; automatically controlled means for successively moving not less than a predetermined number of the balls onto the surface; means for successively feeding the balls to said moving means; means for conducting the balls from the surface and returning same to the feeding means; a motor for synchronizing operations of the moving means and said feeding means; and ball actuated means for stopping the motor at a predetermined time.

33. The combination of baseball game apparatus with means for pitching and manually controlled means for batting balls; of a motor for operating the pitching means and including mechanism inter-connecting the pitching means with the batting means to impart movement in one direction to the latter and movement to the former in another direction at regularly timed intervals.

34. The combination of baseball game apparatus with means for pitching and means for batting balls; of a motor for operating the pitching means and including mechanism inter-connecting the pitching means with the batting means to impart movement in one direction to the latter and movement in another direction to the former; and mechanism cooperable with the motor and the pitching means for successively delivering balls to the latter in synchronism with the aforementioned movements imparted to the pitching means and said batting means.

35. The combination of baseball game apparatus with means for pitching and means for batting balls, and playing balls cooperable with the pitching means and said batting means; of a motor for imparting movements in synchronism to the pitching means and said batting means; and means for utilizing all pitched balls for scoring all plays.

36. In game apparatus; the combination with playing balls; of scoring mechanism cooperable with the balls by direct reception thereof; manually controlled means for imparting motion to the balls; means for conducting the balls to the scoring mechanism; means for directing the balls to the manually controlled means at predetermined intervals whether or not the manually controlled means is actuated and including mechanism for resetting the manually controlled means in synchronism with operation of the ball directing means to direct a ball toward the manually controlled means.

37. The combination in a baseball game apparatus, of a tiltable pitcher figure supported to move simultaneously about respectively different pivotal centers and having means to support a ball; means for transferring a ball to the figure when the latter is tilted to the limit of its movement in one direction; ball batting means cooperable with the pitcher figure; means for setting the batting means in motion at any selected time during operation of the pitcher figure to pitch a ball; and means for automatically returning the batting means to a starting position and for latching same after each pitching operation of the pitching figure.

38. The combination in a baseball game apparatus, of a pitcher figure; means for mounting the figure to tilt about a horizontal center and turn about a vertical center; batting mechanism cooperable with the pitcher figure; means for operating said figure to simultaneously move same about said respective centers; means for operating the pitcher figure at regular intervals for a predetermined period of time; and means for locking the batting mechanism from operating at the expiration of said predetermined period of time.

39. Game apparatus comprising a playing field; playing balls; means for batting said balls over said field; means for pitching said balls to the batting means, the batting means formed and constructed to be controlled manually to bat a ball and including means to render same otherwise inactive when a ball is pitched thereto; scoring means cooperable with the batting means, the pitching means and the balls; and means for operating the pitching means and for continuing operation thereof until predetermined registrations are set up in said scoring means.

40. Game apparatus comprising a playing field; playing balls; means for batting said balls over said field; means for pitching the balls to said batting means; scoring means cooperable with the batting means, the pitching means and the balls; and means beyond manual control for operating the pitching means at regular intervals until a predetermined registration is indicated by the scoring means and for then locking said pitching and also the batting means from operating.

41. In game apparatus; a playing surface; playing balls adapted to move over said surface; respective ball moving mechanisms; a motor for imparting one movement to one mechanism and a different movement to the other mechanism, whereby a ball moving toward said other mechanism from said one mechanism will be struck thereby and projected to one of a plurality of places on the surface as indicative of the scoring value of a play made; and means for manually controlling operations of said other mechanism, whereby it is possible for a ball when struck as aforestated to be received at a preselected one of said places.

42. Mechanism of the class described including a tiltable ball support; a shiftably mounted ball stop; and motor operated means for moving the ball support and the ball stop in synchronism to thereby cause a ball to be thrown from the support and in a direction toward said shiftable ball stop.

43. The combination in a baseball game apparatus; a pitcher figure mounted for simultaneous movement about relatively different pivotal centers and provided with means to freely support a ball; and means for operating said figure at regular intervals to cause the ball to suddenly leave the supporting means after the figure has been moved to a predetermined position.

44. In baseball game apparatus, the combination with ball pitching means movable respectively to two extreme positions; and mechanism for moving the pitching means from one of said positions to the other; of batting means cooperable with the pitching means; and means for placing the batting means under the direct control of an operator during movement of the pitching means from one extreme position to the other and for then placing same beyond further manual control until the expiration of a predetermined period of time.

45. Game apparatus including a playing surface and motor actuated means for moving balls to played positions on said surface; means for stopping the motor actuated means in the event that a predetermined number of balls are moved to one portion of the surface; and means for prolonging operation of the motor actuated means in the event that a predetermined number of balls are first moved to another portion of the surface.

46. Game apparatus including scoring mechanism; motor driven mechanism by means of which actuations are set up in the scoring mechanism; means for stopping the motor driven mechanism in the event that a predetermined indication is established in the scoring mechanism; and means for continuing operation of the motor driven mechanism for a prolonged period of time in the event that a different predetermined indication is established in said scoring mechanism.

47. In game apparatus; tiltable ball pitching means having a portion adapted to freely support a ball; vertically reciprocal means operatively related to the pitching means for transferring a ball to said supporting portion; and means for synchronizing operations of the pitching means and said transferring means to cause a previously transferred ball to be thrown from the pitching means during one movement of the transferring means and for returning the pitching means to a ball receiving position with respect to said transferring means and while another movement is being imparted to said transferring means.

GEORGE H. MINER.